(12) United States Patent
Xiong et al.

(10) Patent No.: US 11,042,838 B1
(45) Date of Patent: Jun. 22, 2021

(54) MERGING EVENTS IN INTERACTIVE DATA PROCESSING SYSTEMS

(71) Applicant: Amazon Technologies, Inc., Seattle, WA (US)

(72) Inventors: Fei Xiong, Arlington, VA (US); Sabarishkumar Iyer, Seattle, WA (US); David Echevarria Ignacio, Seattle, WA (US); Sridhar Boyapati, Sammamish, WA (US); Caylan Lee, Seattle, WA (US); Jacques Daniel Thomas, Seattle, WA (US); Waqas Syed Ahmed, Bellevue, WA (US); Danny Guan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/595,126

(22) Filed: Oct. 7, 2019

Related U.S. Application Data

(63) Continuation of application No. 15/277,696, filed on Sep. 27, 2016, now Pat. No. 10,438,164.

(51) Int. Cl.
*G06Q 10/08* (2012.01)
*H04N 7/18* (2006.01)
(Continued)

(52) U.S. Cl.
CPC ....... *G06Q 10/087* (2013.01); *G06F 16/5854* (2019.01); *G06K 9/6201* (2013.01);
(Continued)

(58) Field of Classification Search
CPC . G06Q 10/087; G06F 16/5854; G06K 9/6201
See application file for complete search history.

(56) References Cited

U.S. PATENT DOCUMENTS

| 5,497,314 A | 3/1996 | Novak |
| 7,290,707 B2 | 11/2007 | Sawasaki |

(Continued)

OTHER PUBLICATIONS

Final Office Action dated Feb. 21, 2019 for U.S. Appl. No. 15/277,696 "Merging Events in Interactive Data Processing Systems" Xiong, 11 pages.

(Continued)

*Primary Examiner* — Ramsey Refai
(74) *Attorney, Agent, or Firm* — Lee & Hayes, P.C.

(57) ABSTRACT

This disclosure describes interactive data processing systems configured to facilitate selection by a human associate of tentative results generated by an automated system from sensor data. In one implementation, an event may take place in a materials handling facility. The event may comprise a pick or place of an item from an inventory location, movement of a user, and so forth. The sensor data associated with the event is processed by an automated system to determine tentative results associated with the event. In some situations, an uncertainty may exist as to which of the tentative results accurately reflects the actual event. The system may then determine whether the event is to be merged with one or more temporally and spatially proximate events and, if so, the sensor data and tentative results for the merged event is sent to a human associate. The associate may select one of the tentative results.

20 Claims, 20 Drawing Sheets

(51) Int. Cl.
*G06K 9/62* (2006.01)
*G06K 9/66* (2006.01)
*G06K 9/78* (2006.01)
*G06F 16/583* (2019.01)
*G06F 3/0484* (2013.01)

(52) U.S. Cl.
CPC ......... *G06K 9/6269* (2013.01); *G06K 9/6288* (2013.01); *G06K 9/66* (2013.01); *G06K 9/78* (2013.01); *H04N 7/18* (2013.01); *G06F 3/04842* (2013.01)

(56) References Cited

U.S. PATENT DOCUMENTS

| | | | |
|---|---|---|---|
| 7,516,888 B1 | 4/2009 | Kundu et al. | |
| 7,631,808 B2 | 12/2009 | Kundu et al. | |
| 8,009,864 B2 * | 8/2011 | Linaker | G06K 9/00664 |
| | | | 382/103 |
| 8,448,858 B1 | 5/2013 | Kundu et al. | |
| 8,630,924 B2 | 1/2014 | Groenevelt et al. | |
| 8,873,794 B2 * | 10/2014 | Sorensen | G06Q 10/087 |
| | | | 382/100 |
| 9,117,106 B2 | 8/2015 | Dedeoglu et al. | |
| 9,235,928 B2 | 1/2016 | Medioni et al. | |
| 9,262,681 B1 * | 2/2016 | Mishra | G06K 9/00771 |
| 9,424,601 B2 | 8/2016 | Brosnan et al. | |
| 9,473,747 B2 | 10/2016 | Kobres et al. | |
| 9,652,737 B1 | 5/2017 | Wasilewsky et al. | |
| 9,892,438 B1 * | 2/2018 | Kundu | G06Q 30/0609 |
| 10,129,507 B2 * | 11/2018 | Landers, Jr. | G06Q 20/202 |
| 2006/0032915 A1 | 2/2006 | Schwartz | |
| 2010/0235406 A1 | 9/2010 | Williams et al. | |
| 2013/0230239 A1 | 9/2013 | Feris et al. | |
| 2013/0284806 A1 | 10/2013 | Margalit | |
| 2015/0012396 A1 | 1/2015 | Puerini et al. | |
| 2015/0029339 A1 | 1/2015 | Kobres et al. | |

OTHER PUBLICATIONS

Office Action for U.S. Appl. No. 15/277,696, dated Sep. 10, 2018, Fei Xiong, "Merging Events in Interactive Data Processing Systems", 8 pages.

* cited by examiner

MERGING EVENTS IN INTERACTIVE DATA PROCESSING SYSTEMS

RELATED APPLICATIONS

This application claims priority to and is a continuation of U.S. patent application Ser. No. 15/277,696, filed on Sep. 27, 2016, the entire contents of which are incorporated herein by reference.

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, and packed and shipped to the customer. Likewise, physical stores maintain inventory in customer accessible areas, such as in a shopping area, and customers can pick items from inventory and take them to a cashier for purchase, rental, and so forth. Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and the like. In each instance, for an item to be moved from one location to another, the item is picked from its current location and transitioned to a new location, users may move about within the facility, and so forth. It is often desirable to generate information about events occurring in the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
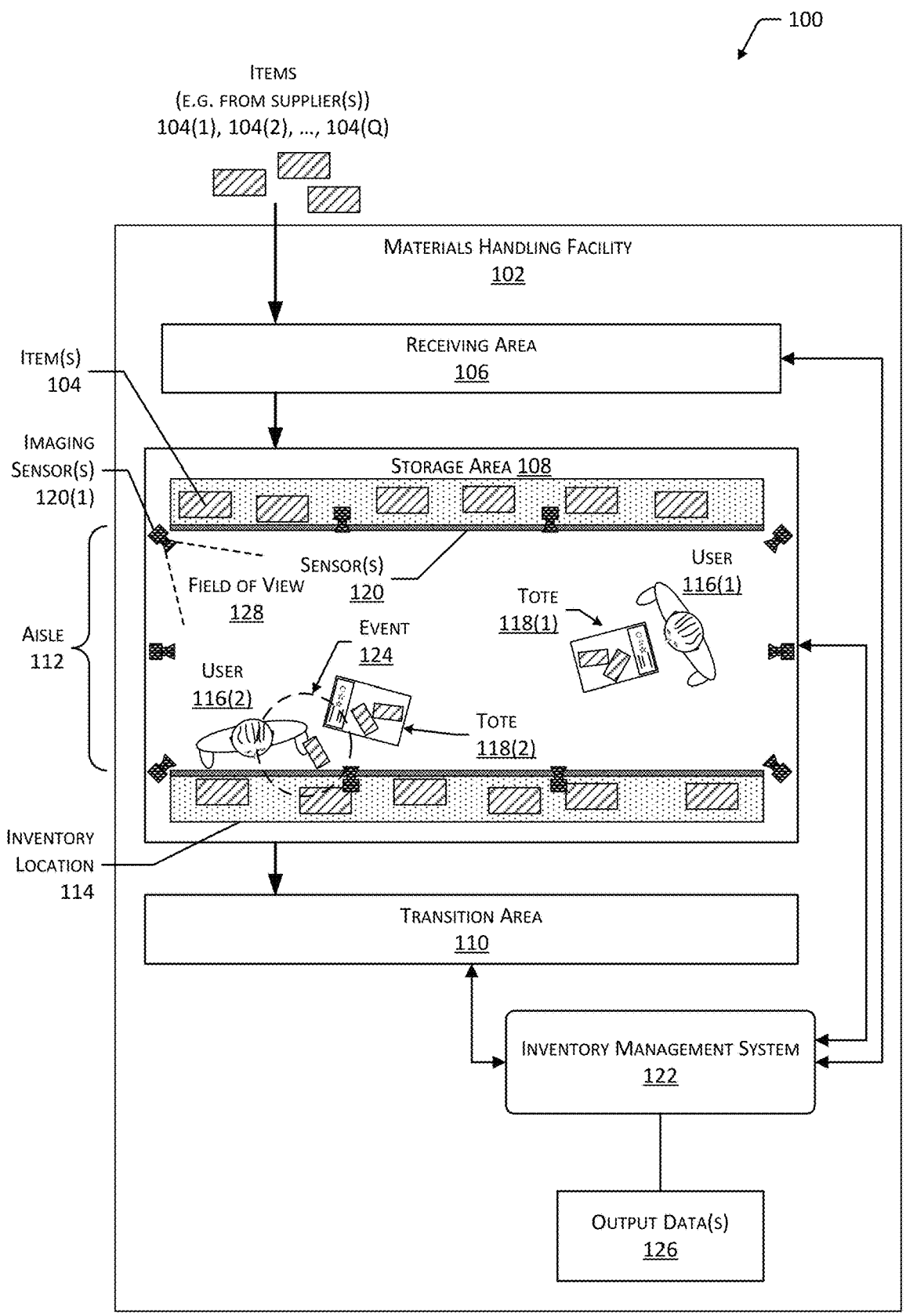
FIG. 1 is a block diagram of a materials handling facility configured to generate output data about one or more events occurring in the facility. In some instances, when multiple events occur close in time and location to one another, the events may be merged to form a merged event which may be analyzed as a single event rather than as a series of discrete events.

This disclosure describes systems and techniques for generating output data indicative of a result of a sequence of multiple events occurring within a materials handling facility (facility). The facility may include, or have access to, an inventory management system. The inventory management system may be configured to maintain information about items, users, condition of the facility, and so forth. For example, the inventory management system may maintain data indicative of a result of different events that occur within the facility, such as what items a particular user is ordered to pick, location of the particular user, availability of a user providing support services to others, requests for assistance, environmental status of the facility, and so forth.

Operation of the inventory management system may be supported by sensor data acquired by one or more sensors. The sensor data may include image data acquired by imaging devices such as cameras, information acquired from radio frequency tags, weight sensors, and so forth.

The inventory management system may determine, using the sensor data, occurrence of one or more events within the facility. Events may involve interactions between one or more items, inventory locations, users, totes, robots, changes in sensor operation, movement of objects, and so forth. For example, a user may remove an item from an inventory location. In another example, two or more users may move past one another or attempt to access the same inventory location contemporaneously. When the system described herein detects sensor data indicative of an event, the system may generate an event record that indicates the occurrence of the event.

The inventory management system may be configured to generate output data providing information indicative of the event using one or more machine learning or automated systems to process the sensor data. For example, artificial neural networks, classifiers, and so forth, may be used to process the image data of an event and identify the item that was removed from the inventory location, identify the users after they move apart, disambiguate if the user picked or placed an item from an inventory location, and so forth.

The inventory management system may be automated to provide the output data during operation. For example, the inventory management system may automatically identify the item removed from an inventory location. However, in some situations, it may be advantageous to use human input to generate or confirm the output data. In these situations, inquiry data may be provided to one or more devices associated with one or more associates supporting operation of the facility.

The inquiry data may comprise at least a portion of the sensor data associated with the event. For example, the sensor data may comprise image data such as a video clip or still image showing the user interacting with an item. An associate user interface presents at least a portion of the image data and generates response data indicative of the input from the associates. In some implementations, the inquiry data may also comprise tentative results of the events. For example, the tentative results may comprise the possible results associated with the event as generated by the inventory management system. Continuing the example, tentative results may comprise a list of the possible items the user may be interacting with. The response data may comprise data indicative of a selection by the associate of one or more of the tentative results.

In some instances, however, certain events within the facility may occur both temporally and spatially adjacent to one another. For instance, a user may pick an item from a shelf (a first event), place the item back onto the same shelf (a second event), pick two new items from the same shelf (a third event), and ultimately place both of these items back on the shelf In these instances, a result of one or more of the events may be determined automatically using the sensor data (e.g., image data, weight data, etc.), while a result of one or more of the events may be determined by asking for input from one or more human users. However, in instances where multiple events occur both close in time and in physical space to one another, the system may incorrectly determine a precise number of events that occurred, which in some instances may result in the generation of too many or too few event records for the sequence. If two event records are generated when in fact only a single event occurred, then the system may determine incorrectly that a user picked multiple items when in fact he or she only picked a single item. Conversely, if the system "misses" an event due to it occurring near in time and space to another event then the system may incorrectly refrain from calculating a result of the event records, leading to an overall incorrect net result of the sequence of events.

Therefore, the systems and techniques described herein may, in certain instances, identify events that occur in both temporal and physical proximity to one another and may merge multiple event records indicative of these events into a single, merged event records. After merging these event records into the merged event record, the system may request input from a human associate regarding a final net result of the merged event record—rather than attempting to correctly determine these events individually, which may lead to an incorrect net result.

As noted above, the system may use sensor data to determine occurrence of an event, such as a user picking an item form a shelf in the facility. The system may use this sensor data to associate a result to an event record associated with this event, such as indication of an item identifier of the item picked, a number of the total items picked, etc. Further, the system may calculate a confidence level associated with the determined result. If this confidence level is higher than a threshold confidence level, the system may store a result of the event. If, however, the confidence level is lower than the threshold confidence level, then the system may request input from an associate.

Before doing so, however, the system may determine whether this event record is to be merged with one or more other event records based on the event occurring near in time and space to other events. That is, the system may search a database of event records for any events that occur: (i) within a threshold amount of time of the subject event record (before or after the subject event), and (ii) within a threshold proximity of a location of the subject event record (e.g., on the same shelf). If such an event record is identified, then the subject event record may be merged with the identified event record to form a merged event record. Further, the system may then determine whether any additional event records occur: (i) within a threshold amount of time of the merged event record time range (before or after), and (ii) within a threshold proximity of an initial location of the first, low-confidence event record. The system may repeat this inquiry until no events are found that meet the time and physical-space criteria. Further, after storing an indication of the merged event record, which now corresponds to a sequence of two or more events, the system may send inquiry data (e.g., sensor data) to a computing device of a selected associate to allow the associate to indicate a net result of the merged event record (that is, the sequence of events). Further, while the above example describes merging two or more events that are spatially and temporally proximate to one another in instances where at least one event is associated with a low-confidence tentative result, in some instances events may be merged regardless of confidence levels. That is, two or more events that are temporally and/or spatially proximate to one another (as introduced above and described in detail below) may be merged with one another regardless of whether the events are associated with results themselves, regardless of whether the confidence values associated with any such results are above or below a threshold, or the like.

In the above example where the user picks an item, replaces the item, picks two of the items, and replaces both of the items to the shelf, the system may merge these four events into a single, merged event and may send a video clip to one or more associates to determine a result of the merged event. The system may, in response, receive information indicating that the net result of the merged event is nothing—that is, that the user neither picked nor replaced any items. The system may then store a result of this merged event.

Further, the system may determine whether any results had been determined regarding the individual events of the sequence of events. If so, the system may delete these results or send an instruction to a downstream system to disregard these results such that these results are not "double counted" (as they are taken into account via the result of the merged event). Further, if any human-associate inquiries have been scheduled for individual event records of the sequence of events, the system may cancel these inquiries, again to avoid the situation where a result of the event is stored based on analysis of the individual event as well as taken into account as part of the merged sequence of events.

As noted above, the system may generate a user interface and may send this interface to a computing device of one or more associates for determine a result of an event (merged or otherwise). In instances where a sequence of events have been merged into a single, merged event, the user interface may include sensor data spanning at least a time corresponding to a start time of the earliest of the merged events to a time corresponding to an end time of the latest of the merged events. For instance, the user interface may include a video clip spanning the entirety of the merged event, thus allowing the human associate to view the entire sequence and provide response data indicative of a net result of the merged event.

In some implementations, the associate user interface may present supplemental data to the associate. The supplemental data may comprise additional information deemed to be of possible use in generating the response data. The supplemental data may comprise overlays of one or more graphical user interface elements. For example, the supplemental data may comprise bounding boxes that are arranged to designate in the image data a particular region of the image that that may be of interest. For example, where the inquiry data is associated with determining the identity of an item, the supplemental data may comprise a bounding box overlaid upon the image data during presentation in the associate user interface. In other implementations, the supplemental data may comprise other information such as descriptive text, weights, relative velocities, and so forth. For example, the supplemental data may comprise velocity data of objects in the image data, and the supplemental data may be overlaid as a "heat map" such that red indicates motion towards the camera and blue indicates motion away.

One or more associates may be selected to process the inquiry data. For example, the inquiry data associated with the same event may be distributed to a plurality of associates for processing. The response data from the individual associates may be processed to determine a consensus result. For example, the consensus result may comprise a particular result of response data that was selected by a majority of the associates.

Selection of the associates may be based on type of inquiry, skill of the individual associates, accessibility of the sensor data to the associate, and so forth. For example, the inventory management system may be configured to resolve inquiries about events occurring within the facility within a relatively short threshold of time, such as twenty seconds. Associates located at the facility and having access via a high-speed local area network to the sensor data as stored locally may be selected for processing these inquiries. In comparison, events that are not as time sensitive may be distributed to associates outside of the facility with slower access to the sensor data. In another example, external associates may be used to provide additional verification as to the veracity of the response data generated by the associates within the facility.

The associates may be used to generate response data in a variety of situations. Some events may be deemed to be of high enough priority to warrant human input to generate or confirm the output data. For example, user handling of age restricted or hazardous items may be designated as requiring human assurance as to the output data. For some events, the inventory management system may be unable to generate output data with a confidence level that meets a minimum threshold as described above. For example, the image data may depict a scene that the inventory management system has not been previously configured to process. In another example, the image data may be of decreased quality or contain images that are at least partly obscured, such that the inventory management system is unable to automatically differentiate between two users. In these instances, the system may determine whether the event is to be merged with one or more temporally and spatially adjacent events and may then provide the inquiry data for the event (or merged event) to the human associate for determining a result of the event (or merged event).

The facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

The systems and techniques described herein allow the inventory management system to generate output data that may be used to operate the facility. By distributing inquiry data about events to associates for processing, high accuracy output data may be generated and used to operate the facility without burdening the users of the facility. Furthermore, the output data may be used to train the inventory management system. For example, the sensor data and corresponding output data may be used to train the machine learning portions of the inventory management system, further improving future processing of the sensor data. By using the techniques described herein, the user experience of the users in the facility and overall operation of the inventory management system may be improved.

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) may be held. As used in this disclosure, letters in parenthesis such as "(Q)" indicate an integer result. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms for holding or storing the items 104. The inventory locations 114 may be affixed to the floor or another portion of the facility's structure, or may be movable such that the arrangements of aisles 112 may be reconfigurable. In some implementations, the inventory locations 114 may be configured to move independently of an outside operator.

For example, the inventory locations 114 may comprise a rack with a power source and a motor, operable by a computing device to allow the rack to move from one location within the facility 102 to another.

One or more users 116(1), 116(2), . . . , 116(U) (generally denoted as 116), totes 118(1), 118(2), . . . , 118(T) (generally denoted as 118) or other material handling apparatus may move within the facility 102. For example, the users 116 may move about within the facility 102 to pick or place the items 104 in various inventory locations 114, placing them on the totes 118 for ease of transport. An individual tote 118 is configured to carry or otherwise transport one or more items 104. For example, a tote 118 may include a basket, a cart, a bag, and so forth. The tote 118 is discussed in more detail below with regard to FIG. 5. In other implementations, other agencies such as robots, forklifts, cranes, aerial drones, and so forth, may move about the facility 102 picking, placing, or otherwise moving the items 104.

One or more sensors 120 may be configured to acquire information in the facility 102. The sensors 120 may include, but are not limited to, cameras 120(1), weight sensors, radio frequency (RF) receivers, temperature sensors, humidity sensors, vibration sensors, and so forth. The sensors 120 may be stationary or mobile, relative to the facility 102. For example, the inventory locations 114 may contain cameras 120(1) configured to acquire images of pick or placement of items 104 on shelves, of the users 116(1) and 116(2) in the facility 102, and so forth. In another example, the floor of the facility 102 may include weight sensors configured to determine a weight of the users 116 or other object thereupon. The sensors 120 are discussed in more detail below with regard to FIG. 2.

During operation of the facility 102, the sensors 120 may be configured to provide information suitable for tracking how objects move or other occurrences within the facility 102. For example, a series of images acquired by an camera 120(1) may indicate removal of an item 104 from a particular inventory location 114 by one of the users 116 and placement of the item 104 on or at least partially within one of the tote 118s.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. For example, multiple different receiving areas 106, storage areas 108, and transition areas 110 may be interspersed rather than segregated in the facility 102.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, or the transition area 110. These interactions may include one or more events 124. For example, events 124 may include the entry of the user 116 to the facility 102, stocking of items 104 at an inventory location 114, picking of an item 104 from an inventory location 114, placement of an item 104 within a tote 118, movement of users 116 relative to one another, gestures by the users 116, and so forth. Other events 124 involving users 116 may include the user 116 providing authentication information in the facility 102, using a computing device at the facility 102 to authenticate identity to the inventory management system 122, and so forth. Some events 124 may involve one or more other objects within the facility 102. For example, the event 124 may comprise movement within the facility 102 of an inventory location 114, such as a counter mounted on wheels. Events 124 may involve one or more of the sensors 120. For example, a change in operation of a sensor 120, such as a sensor failure, change in alignment, and so forth, may be designated as an event 124. Continuing the example, movement of an camera 120(1) resulting in a change in the orientation of the field of view 128 (such as resulting from someone or something bumping the camera 120(1)) may be designated as an event 124.

By determining the occurrence of one or more of the events 124, the inventory management system 122 may generate output data 126. The output data 126 comprises information about the event 124. For example, where the event 124 comprises an item 104 being removed from an inventory location 114, the output data 126 may comprise an item identifier indicative of the particular item 104 that was removed from the inventory location 114. As described in detail below, in some instances a sequence of events that are spatially and temporally proximate to one another may be merged to form a merged event record, and the inventor management system 122 may determine and store output data 124 for the merged event in lieu of output data for the individual events in the sequence.

The inventory management system 122 may use one or more automated systems to generate the output data 126. For example, an artificial neural network, one or more classifiers, or other automated machine learning techniques may be used to process the sensor data from the one or more sensors 120 to generate output data 126. The automated systems may operate using probabilistic or non-probabilistic techniques. For example, the automated systems may use a Bayesian network. In another example, the automated systems may use support vector machines to generate the output data 126 or the tentative results. The automated systems may generate confidence level data that provides information indicative of the accuracy or confidence that the output data 126 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 95%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 104, user 116, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 116 may pick an item 104(1) such as a perfume bottle that is generally cubical in shape from the inventory location 114. Other items 104 at nearby inventory locations 114 may be predominately spherical. Based on the difference in shape (cube vs. sphere) from the adjacent items, and the correspondence in shape with the previously stored image of the perfume bottle item 104(1) (cubical and cubical), the confidence level that the user 114 has picked up the perfume bottle item 104(1) is high.

In some situations, the automated techniques may be unable to generate output data 126 with a confidence level above a threshold result. For example, the automated techniques may be unable to distinguish which user 116 in a crowd of users 116 has picked up the item 104 from the inventory location 114. In other situations, it may be desirable to provide human confirmation of the event 124 or of the accuracy of the output data 126. For example, some items 104 may be deemed age restricted such that they are to be handled only by users 116 above a minimum age threshold.

Using the techniques described in this disclosure, sensor data associated with an event 124 may be processed to generate inquiry data. The inquiry data may include a subset of the sensor data associated with the event 124. The inquiry data may also include one or more of one or more tentative results as determined by the automated techniques, or supplemental data. The subset of the sensor data may be determined using information about the one or more sensors 120. For example, camera data such as the location of the camera 120(1) within the facility 102, the orientation of the camera 120(1), and a field of view 128 of the camera 120(1) may be used to determine if a particular location within the facility 102 is within the field of view 128. The subset of the sensor data may include images that may show the inventory location 114 or that the item 104 was stowed. The subset of the sensor data may also omit images from other cameras 120(1) that did not have that inventory location 114 in the field of view 128. The field of view 128 may comprise a portion of the scene in the facility 102 that the sensor 120 is able to generate sensor data about.

Continuing the example, the subset of the sensor data may comprise a video clip acquired by one or more cameras 120(1) having a field of view 128 that includes the item 104. The tentative results may comprise the "best guess" as to which items 104 may have been involved in the event 124. For example, the tentative results may comprise results determined by the automated system that have a confidence level above a minimum threshold.

Furthermore, and as noted above, when a result of an event record is determined to be below a threshold confidence result, prior to sending the sensor data associated with the event 124 to the human associate, the inventor management system 122 may determine whether the record of the event 124 is to be merged with any other event records. If so, the inventor management system 122 may store an indication of the merged event and may send the user interface comprising inquiry data (e.g., a video clip, etc.) associated with the entire merged event to the computing device of the human associate.

In some instances, the user interface may also include supplemental data, such as the weight of the item 104, bounding boxes or other visual cues to overlay or that have been inserted into the video clip for presentation, and so forth. The inquiry data is provided to a device associated with an associate. For example, the device may comprise a tablet computer, laptop computer, personal computer, set-top box, and so forth. The device presents an associate user interface based at least in part on the inquiry data. Continuing the example, the associate user interface may present the video clip of the item 104 being removed from the inventory location 114. One or more of the tentative results associated with the identity of the item 104 may also be presented in the associate user interface. The associate may view the video clip and the supplemental data and make a selection from the tentative results to identify the item 104 was removed from the inventory location 114. The selection or other information generated by the associate comprises response data. The response data from one or more associates may be processed to generate the output data 126. For example, the majority of the associates may identify the item 104 that was picked from the inventory location 114 as "5 oz box powdered toast". Based at least in part on the majority selection, the inventory management system 122 may generate output data 126 indicating that the item 104 picked was "5 oz box powdered toast".

The facility 102 may be configured to receive different kinds of items 104 from various suppliers and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 102. The receiving of the items 104 may comprise one or more events 124 for which the inventory management system 122 may generate output data 126.

Upon being received from a supplier at receiving area 106, the items 104 may be prepared for storage. For example, items 104 may be unpacked or otherwise rearranged. The inventory management system 122 may include one or more software applications executing on a computer system to provide inventory management functions based on the events 124 associated with the unpacking or rearrangement. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 102, those items 104 may be stored in several different inventory locations 114 to reduce congestion that might occur at a single inventory location 114. Storage of the items 104 and their respective inventory locations 114 may comprise one or more events 124.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102. Picking may comprise one or more events 124, such as the user 116 in moving to the inventory location 114, retrieval of the item 104 from the inventory location 114, and so forth.

After items 104 have been picked, they may be processed at a transition area 110. The transition area 110 may be any designated area within the facility 102 where items 104 are transitioned from one location to another or from one entity to another. For example, the transition area 110 may be a packing station within the facility 102. When the item 104 arrives at the transition area 110, the items 104 may be transitioned from the storage area 108 to the packing station. The transitioning may comprise one or more events 124. Information about the transition may be maintained by the inventory management system 122 using the output data 126 associated with those events 124.

In another example, if the items 104 are departing the facility 102 a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102. The purchase or rental may comprise one or more events 124.

During use of the facility 102, the user 116 may move about the facility 102 to perform various tasks, such as picking or placing the items 104 in the inventory locations 114. Pluralities of users 116 may move past one another, travel in groups, may coalesce into groups, groups may break apart, and so forth. These movements may comprise one or more events 124. For example, an event 124 may comprise a plurality of users 116 moving past one another in the aisle 112.

The inventory management system 122 may access or generate sensor data about the facility 102 and the contents therein including the items 104, the users 116, the totes 118, and so forth. The sensor data may be acquired by one or more of the sensors 120, data provided by other systems, and so forth. For example, the sensors 120 may include cameras 120(1) configured to acquire image data of scenes in the facility 102. The image data may comprise still images, video, or a combination thereof. The image data may be processed by the inventory management system 122 to determine a location of the user 116, the tote 118, the identity of the user 116, and so forth. The sensors 120 are discussed in more detail below with regard to FIG. 2.

The inventory management system 122, or systems coupled thereto, may be configured to identify the user 116. In one implementation, this determination may comprise comparing sensor data with previously stored identity data. For example, the user 116 may be identified by showing their face to a facial recognition system, by presenting a token carrying authentication credentials, providing a fingerprint, and so forth. Identification of the user 116 may comprise an event 124 with the output data 126 comprising information indicative of the identity. Identity of the user 116 may be determined before, during, or after entry to the facility 102. Determination of the user's 116 identity may comprise comparing sensor data associated with the user 116 in the facility 102 to previously stored user data.

By determining the occurrence of one or more events 124 and the output data 126 associated therewith, the inventory management system 122 is able to provide one or more services to the users 116 of the facility 102. By utilizing one or more human associates to process inquiry data and generate response data that may then be used to produce output data 126, overall accuracy of the system may be enhanced. The enhanced accuracy may improve the user experience of the one or more users 116 of the facility 102.

Figure 2:
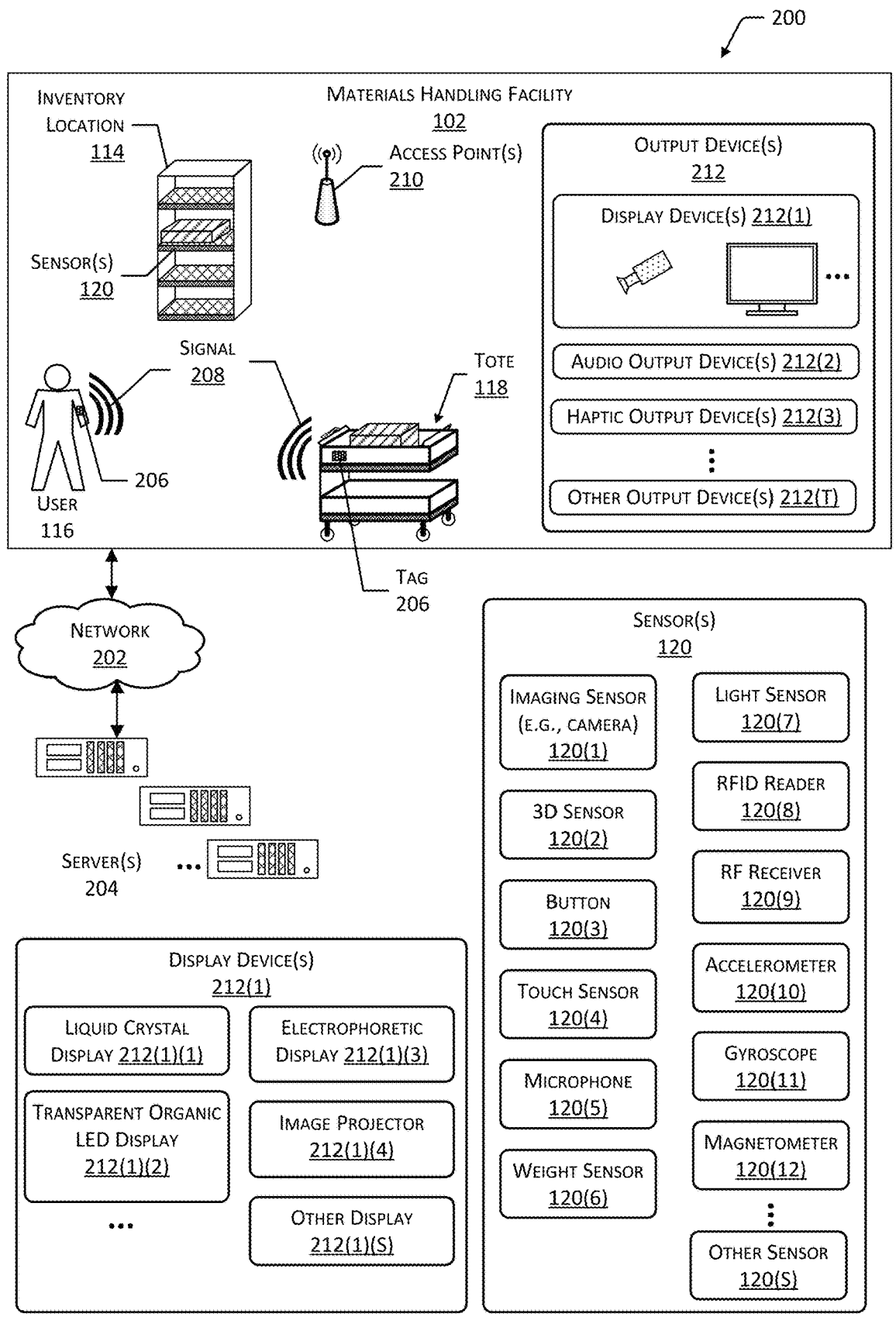
FIG. 2 is a block diagram illustrating additional details of the facility.

FIG. 2 is a block diagram 200 illustrating additional details of the facility 102, according to some implementations. The facility 102 may be connected to one or more networks 202, which in turn connect to one or more servers 204. The network 202 may include private networks such as an institutional or personal intranet, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., cellular, microwave, satellite), or other connection technologies.

The servers 204 may be configured to execute one or more modules or software applications associated with the inventory management system 122. While the servers 204 are illustrated as being in a location outside of the facility 102, in other implementations, at least a portion of the servers 204 may be located at the facility 102. The servers 204 are discussed in more detail below with regard to FIG. 3.

The users 116, the totes 118, or other objects in the facility 102 may be equipped with one or more tags 206, such as radio frequency (RF) tags. The tags 206 may be configured to emit a signal 208. In one implementation, the tag 206 may be a radio frequency identification (RFID) tag configured to emit a RF signal 208 upon activation by an external signal. For example, the external signal may comprise a radio frequency signal or a magnetic field configured to energize or activate the RFID tag 206. In another implementation, the tag 206 may comprise a transmitter and a power source configured to power the transmitter. For example, the tag 206 may comprise a Bluetooth Low Energy (BLE) transmitter and battery. In other implementations, the tag 206 may use other techniques to indicate presence. For example, an acoustic tag 206 may be configured to generate an ultrasonic signal which is detected by corresponding acoustic receivers. In yet another implementation, the tag 206 may be configured to emit an optical signal.

The inventory management system 122 may be configured to use the tags 206 for one or more of identification of the object, determining a location of the object, and so forth. For example, the users 116 may wear tags 206, the totes 118 may have tags 206 affixed, and so forth, which may be read and, based at least in part on signal strength, used to determine identity and location. Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, at a ceiling, at an inventory location 114, on the tote 118, may be carried or worn by the user 116, and so forth. The sensors 120 produce respective sensor data.

The sensors 120 may include one or more cameras 120(1). These cameras 120(1) may include cameras configured to acquire images of a scene. The cameras 120(1) are configured to detect light in one or more wavelengths including, but not limited to, terahertz, infrared, visible, ultraviolet, and so forth. The inventory management system 122 may use image data acquired by the cameras 120(1) during operation of the facility 102. For example, the inventory management system 122 may identify items 104, identify users 116, identify totes 118, determine a location, and so forth, based at least in part on their appearance within the image data.

One or more three-dimensional (3D) sensors 120(2) may also be included in the sensors 120. The 3D sensors 120(2) are configured to acquire spatial or 3D data, such as depth information, about objects within a sensor field-of-view. The 3D sensors 120(2) include range cameras, lidar systems, sonar systems, radar systems, structured light systems, stereo vision systems, optical interferometry systems, and so forth. The inventory management system 122 may use the 3D data acquired to identify objects, determine a location of an object, and so forth. For example, the inventory management system 122 may determine operational data such as location in the facility 102 of the user 116 based at least in part on the location in 3D space of the user 116.

One or more buttons 120(3) are configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116 and produce button data.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the position of a touch or near-touch and generate touch sensor data. For example, the IFSR may comprise a material configured to change electrical resistance responsive to an applied force. The position within the material of that change in electrical resistance may indicate the position of the touch. The inventory management system 122 may use data from the touch sensors 120(4) to receive information from the user 116. For example, the touch sensor 120(4) may be integrated with the tote 118 to provide a touchscreen with which the user 116 may select from a menu one or more particular items 104 for picking.

One or more microphones 120(5) may be configured to acquire information indicative of sound present in the environment and generate audio data. In some implementations, arrays of microphones 120(5) may be used. These arrays may implement beamforming techniques to provide for directionality of gain. The inventory management system 122 may use the one or more microphones 120(5) to acquire information from acoustic tags, accept voice input from the users 116, determine the location of one or more users 116 in the facility 102, determine ambient noise level, and so forth.

One or more weight sensors 120(6) are configured to measure the weight of a load, such as the item 104, the user 116, the tote 118, and so forth and generate weight data. The weight sensors 120(6) may be configured to measure the weight of the load at one or more of the inventory locations 114, the tote 118, or on the floor of the facility 102. The weight sensors 120(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers, which generate one or more signals based on an applied force, such as that of the load due to gravity. The inventory management system 122 may use the data acquired by the weight sensors 120(6) to identify an object, determine a location of an object, maintain shipping records, identify the user 116, and so forth.

The sensors 120 may include one or more light sensors 120(7) configured to generate light sensor data. The light sensors 120(7) may be configured to provide information associated with ambient lighting conditions such as a level of illumination. Information acquired by the light sensors 120(7) may be used by the inventory management system 122 to adjust a level, intensity, or configuration of the user interface.

One more radio frequency identification (RFID) readers 120(8), near field communication (NFC) systems, and so forth, may also be provided in the sensors 120. For example, the RFID readers 120(8) may be configured to read the tags 206 and generate RFID tag data. Information acquired by the RFID reader 120(8) may be used by the inventory management system 122 to identify an object associated with the tag 206 such as the item 104, the user 116, the tote 118, and so forth. For example, based on information from the RFID readers 120(8), a velocity of the tag 206 may be determined.

One or more RF receivers 120(9) may also be provided in the sensors 120 to generate radio-frequency data. In some implementations, the RF receivers 120(9) may be part of transceiver assemblies. The RF receivers 120(9) may be configured to acquire RF signals 208 associated with Wi-Fi™, Bluetooth®, ZigBee®, Z-Wave, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source, such as a communication interface onboard the tote 118 or carried by the user 116.

The sensors 120 may include one or more accelerometers 120(10) that may be worn or carried by the user 116, mounted to the tote 118, and so forth. The accelerometers 120(10) may provide accelerometer data such as the direction and magnitude of an imposed acceleration. Data such as rate of acceleration, determination of changes in direction, speed, and so forth, may be determined using the accelerometers 120(10).

A gyroscope 120(11) provides gyroscope data indicative of rotation of an object affixed thereto. For example, the tote 118, the user 116, or other objects may be equipped with a gyroscope 120(11) to provide data indicative of a change in orientation.

A magnetometer 120(12) may be used to determine an orientation by measuring ambient magnetic fields, such as the terrestrial magnetic field. The magnetometer 120(12) may generate magnetometer data indicative of the direction, strength, and so forth of a magnetic field. The magnetometer 120(12) may be worn or carried by the user 116, mounted to the tote 118, and so forth. For example, the magnetometer 120(12) mounted to the tote 118 may act as a compass and provide information indicative of which way the tote 118 is oriented.

The sensors 120 may include other sensors 120(S) as well. For example, the other sensors 120(S) may include proximity sensors, ultrasonic rangefinders, thermometers, barometric sensors, hygrometers, biometric input devices including, but not limited to, fingerprint readers or palm scanners, and so forth. For example, the inventory management system 122 may use information acquired from thermometers and hygrometers in the facility 102 to direct the user 116 to check on delicate items 104 stored in a particular inventory location 114.

The facility 102 may include one or more access points 210 configured to establish one or more wireless networks and the network 202. The access points 210 may use Wi-Fi™, NFC, Bluetooth®, or other technologies to establish wireless communications between a device and the network 202. The wireless networks allow the devices to communicate with one or more of the inventory management system 122, the sensors 120, the tag 206, a communication device of the tote 118, or other devices.

Output devices 212 may also be provided in the facility 102. The output devices 212 are configured to generate signals which may be perceived by the user 116. The output devices 212 may include display devices 212(1), audio output devices 212(2), haptic output devices 212(3), or other output devices 212(T).

The display devices 212(1) may be configured to provide output which may be seen by the user 116 or detected by a light-sensitive detector such as an camera 120(1) or light sensor 120(7). The output may be monochrome or color. The display devices 212(1) may be emissive, reflective, or both. An emissive display device 212(1) is configured to emit light during operation. For example, a light emitting diode (LED) is an emissive visual display device 212(1). In comparison, a reflective display device 212(1) relies on ambient light to present an image. For example, an electrophoretic display 212(1)(3) is a reflective display device 212(1). Backlights or front lights may be used to illuminate the reflective visual display device 212(1) to provide visibility of the information in conditions where the ambient light levels are low.

Mechanisms of the display devices 212(1) may include liquid crystal displays 212(1)(1), transparent organic LED displays 212(1)(2), electrophoretic displays 212(1)(3), image projectors 212(1)(4), or other displays 212(1)(S). The other displays 212(1)(S) may include, but are not limited to, micro-electromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display devices 212(1) may be configured to present images. For example, the display devices 212(1) may comprise a pixel-addressable display. The image may comprise at least a two-dimensional array of pixels or a vector representation of an at least two-dimensional image.

In some implementations, the display devices 212(1) may be configured to provide non-image data, such as text characters, colors, and so forth. For example, a segmented electrophoretic display 212(1)(3), segmented LED, and so forth, may be used to present information such as a stock keeping unit (SKU) number. The display devices 212(1) may also be configurable to vary the color of the text, such as using multicolor LED segments.

In some implementations, display devices 212(1) may be configurable to provide image or non-image output. For example, an electrophoretic display 212(1)(3) with addressable pixels may be used to present images of text information, or all of the pixels may be set to a solid color to provide a colored panel.

One or more audio output devices 212(2) are configured to provide acoustic output. The acoustic output includes one or more of infrasonic sound, audible sound, or ultrasonic sound. The audio output devices 212(2) may use one or more mechanisms to generate the sound. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

Haptic output devices 212(3) are configured to provide a signal which results in a tactile sensation to the user 116. The haptic output devices 212(3) may use one or more mechanisms such as electrical stimulation or mechanical displacement to provide the signal. For example, the haptic output devices 212(3) may be configured to generate a modulated electrical signal, which produces an apparent tactile sensation in one or more fingers of the user 116. In another example, the haptic output devices 212(3) may comprise piezoelectric or rotary motor devices configured to provide a vibration, which may be felt by the user 116.

The facility 102 may include an interface device that comprises the sensors 120, the output devices 212, or both. For example, the tote 118 may include an interface device such as a display device 212(1) and a touch sensor 120(4). In some implementations, the interface device may include hardware processors, memory, and other elements configured to present a user interface, process input to the user interface, and so forth. Users 116, associates, or both users 116 and associates may use the interface device.

Other output devices 212(T) may also be present. For example, the other output devices 212(T) may include scent/odor dispensers, document printers, 3D printers or fabrication equipment, and so forth.

The inventory management system 122 may generate user interface data, which is then used by the interface device to present the user interface. The user interface may be configured to stimulate one or more senses of the user 116 or associate. For example, the user interface may comprise visual, audible, and haptic output.

Figure 3:
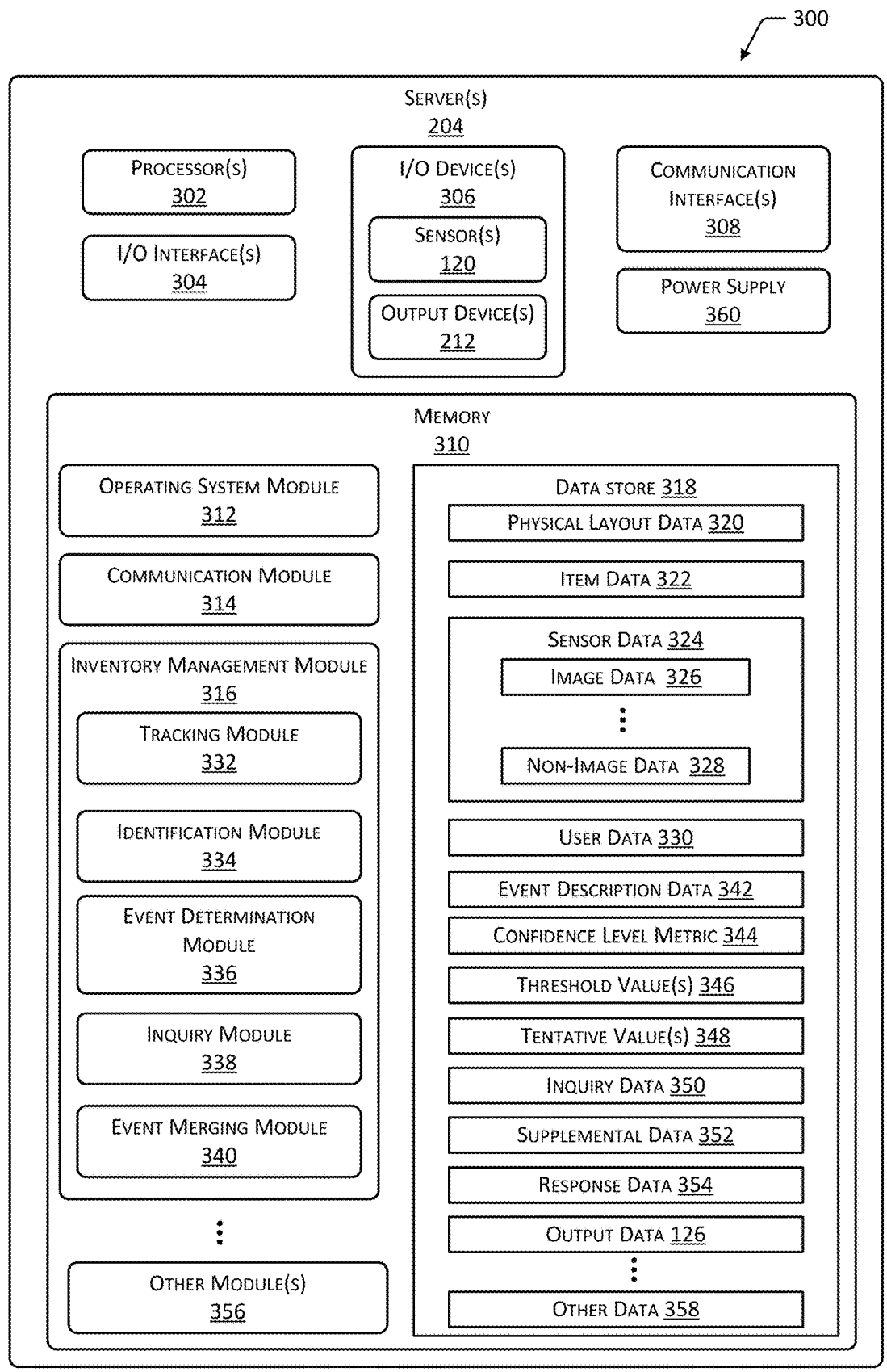
FIG. 3 illustrates a block diagram of a server configured to support operation of the facility.

FIG. 3 illustrates a block diagram 300 of the server 204. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing," "software as a service (SaaS)," "platform computing," "network-accessible platform," "cloud services," "data centers," and so forth. Services provided by the server 204 may be distributed across one or more physical or virtual devices.

The server 204 may include one or more hardware processors 302 (processors) configured to execute one or more stored instructions. The processors 302 may comprise one or more cores. The server 204 may include one or more input/output (I/O) interface(s) 304 to allow the processor 302 or other portions of the server 204 to communicate with other devices. The I/O interfaces 304 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 304 may couple to one or more I/O devices 306. The I/O devices 306 may include input devices such as the sensors 120, one or more of a keyboard, mouse, scanner, and so forth. The I/O devices 306 may also include output devices 212 such as one or more of a display, printer, audio speakers, and so forth. In some embodiments, the I/O devices 306 may be physically incorporated with the server 204 or may be externally placed.

The server 204 may also include one or more communication interfaces 308. The communication interfaces 308 are configured to provide communications between the server 204 and other devices, such as the sensors 120, the interface devices, routers, the access points 210, and so forth. The communication interfaces 308 may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi™, and so forth.

The server 204 may also include one or more busses or other internal communications hardware or software that allow for the transfer of data between the various modules and components of the server 204.

As shown in FIG. 3, the server 204 includes one or more memories 310. The memory 310 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the server 204. A few example functional modules are shown stored in the memory 310, although the same functionality may alternatively be implemented in hardware, firmware, or as a system on a chip (SOC).

The memory 310 may include at least one operating system (OS) module 312. The OS module 312 is configured to manage hardware resource devices such as the I/O interfaces 304, the I/O devices 306, the communication interfaces 308, and provide various services to applications or modules executing on the processors 302. The OS module 312 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following modules may also be stored in the memory 310. These modules may be executed as foreground applications, background tasks, daemons, and so forth.

A communication module 314 may be configured to establish communications with one or more of the sensors 120, one or more of the devices used by associates, other servers 204, or other devices. The communications may be authenticated, encrypted, and so forth.

The memory 310 may store an inventory management module 316. The inventory management module 316 is configured to provide the inventory functions as described herein with regard to the inventory management system 122. For example, the inventory management module 316 may track movement of items 104 in the facility 102, generate user interface data, and so forth.

The inventory management module 316 may access information stored in a data store 318 in the memory 310. The data store 318 may use a flat file, database, linked list, tree, executable code, script, or other data structure to store the information. In some implementations, the data store 318 or a portion of the data store 318 may be distributed across one or more other devices including other servers 204, network attached storage devices, and so forth.

The data store 318 may include physical layout data 320. The physical layout data 320 provides a mapping of physical locations within the physical layout of devices and objects such as the sensors 120, inventory locations 114, and so forth. The physical layout data 320 may indicate the coordinates within the facility 102 of an inventory location 114, sensors 120 within view of that inventory location 114, and so forth. For example, the physical layout data 320 may include camera data comprising one or more of a location within the facility 102 of an camera 120(1), orientation of the camera 120(1), the operational status, and so forth. Continuing example, the physical layout data 320 may indicate the coordinates of the camera 120(1), pan and tilt information indicative of a direction that the field of view 128 is oriented along, whether the camera 120(1) is operating or malfunctioning, and so forth.

In some implementations, the inventory management module 316 may access the physical layout data 320 to determine if a location associated with the event 124 is within the field of view 128 of one or more sensors 120. Continuing the example above, given the location within the facility 102 of the event 124 and the camera data, the inventory management module 316 may determine the cameras 120(1) that may have generated images of the event 124.

The item data 322 comprises information associated with the items 104. The information may include information indicative of one or more inventory locations 114 at which one or more of the items 104 are stored. The item data 322 may also include order data, SKU or other product identifier, price, quantity on hand, weight, expiration date, images of the item 104, detail description information, ratings, ranking, and so forth. The inventory management module 316 may store information associated with inventory management functions in the item data 322.

The data store 318 may also include sensor data 324. The sensor data 324 comprises information acquired from, or based on, the one or more sensors 120. For example, the sensor data 324 may comprise 3D information about an object in the facility 102. As described above, the sensors 120 may include an camera 120(1), which is configured to acquire one or more images. These images may be stored as the image data 326. The image data 326 may comprise information descriptive of a plurality of picture elements or pixels. Non-image data 328 may comprise information from other sensors 120, such as input from the microphones 120(5), weight sensors 120(6), and so forth.

User data 330 may also be stored in the data store 318. The user data 330 may include identity data, information indicative of a profile, purchase history, location data, images of the user 116, demographic data, and so forth. The user data 330 is discussed in more detail below with regard to FIG. 5. Individual users 116 or groups of users 116 may selectively provide user data 330 for use by the inventory management system 122. The individual users 116 or groups of users 116 may also authorize collection of the user data 330 during use of the facility 102 or access to user data 330 obtained from other systems. For example, the user 116 may opt-in to collection of the user data 330 to receive enhanced services while using the facility 102.

In some implementations, the user data 330 may include information designating a user 116 for special handling. For example, the user data 330 may indicate that a particular user 116 has been associated with an increased number of errors with respect to output data 126. The inventory management module 316 may be configured to use this information to apply additional scrutiny to the events 124 associated with this user 116. For example, events 124 that include an item 104 having a cost or result above the threshold amount may be provided to the associates for processing regardless of the determined level of confidence in the output data 126 as generated by the automated system.

The inventory management module 316 may include one or more of a tracking module 332, identification module 334, event determination module 336, inquiry module 338, and event merging module 340. The tracking module 332 may be configured to track one or more objects associated with the facility 102. For example, the tracking module 332 may access the sensor data 324 to determine location data.

The location data provides information indicative of a location of an object, such as the item 104, the user 116, the tote 118, and so forth. The location may be absolute with respect to the facility 102 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 102, 5.2 m from an inventory location 114 along a heading of 169°, and so forth. For example, the location data may indicate that the user 116(1) is 25.2 m along the aisle 112(1) and standing in front of the inventory location 114(47). In comparison, a relative location may indicate that the user 116(1) is 32 cm from the tote 118 at a heading of 730 with respect to the tote 118. The location data may include orientation information, such as which direction the user 116 is facing. The orientation may be determined by the relative direction the user's 116 body is facing. In some implementations, the orientation may be relative to the interface device. Continuing the example, the location data may indicate that the user 116(1) is oriented with a heading of 0°, or looking north. In another example, the location data may indicate that the user 116 is facing towards the interface device.

The identification module 334 is configured to identify an object. In one implementation, the identification module 334 may be configured to identify an item 104. In another implementation, the identification module 334 may be configured to identify the user 116. For example, the identification module 334 may use facial recognition techniques to process the image data 326 and determine the identity data of the user 116 depicted in the images by comparing the characteristics in the image data 326 with previously stored results. The identification module 334 may also access data from other sensors 120, such as from the RFID reader 120(8), the RF receiver 120(9), fingerprint sensors, and so forth.

Facial recognition may include analyzing facial characteristics which are indicative of one or more facial features in an image, 3D data, or both. For example, the face of the user 116 may be detected within one or more of the images of the image data 326. The facial features include measurements of, or comparisons between, facial fiducials or ordinal points. The facial features may include eyes, mouth, lips, nose, chin, ears, face width, skin texture, 3D shape of the face, presence of eyeglasses, and so forth. In some implementations, the facial characteristics may include facial metrics. The facial metrics indicate various ratios of relative sizes and spacing of the facial features. For example, the facial metrics may include a ratio of interpupillary distance to facial width, ratio of eye width to nose width, and so forth. In some implementations, the facial characteristics may comprise a set of eigenvectors by using principal component analysis (PCA) on a set of images. These eigenvectors, as descriptive of a human face, may be known as "eigenfaces" or "eigenimages".

In one implementation, the facial recognition described in this disclosure may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In other implementations, other techniques may be used to recognize faces. Previously stored registration data may associate particular facial characteristics with a particular identity, such as represented by a user account. For example, the particular pattern of eigenvectors in the image may be sought in the previously stored data, and matches within a threshold tolerance may be determined to indicate identity of the user 116. The eigenvectors or other measurements may be compared with previously stored characteristics to determine the user data 330 of the person in the image or to distinguish one user 116 from another.

The event determination module 336 is configured to process the sensor data 324 and generate output data 126. The event determination module 336 may access information stored in the data store 318 including, but not limited to, event description data 342, confidence levels 344, or threshold results 346.

The event merging module 340 is configured to determine when to merge a sequence of events into a single, merged event and generate a corresponding merged event record. For instance, after the event determination module 336 determines occurrence of an event and a tentative result of the event record is determined, a confidence level of the tentative result may be associated with the tentative result. If the confidence level is less than a threshold confidence, then the event merging module 140 may determine whether one or more events have occurred that are within a threshold time of the event and within a threshold proximity of the a location of the event. If so, then event merging module 140 may store an indication that these two events comprise a single, merged event. In addition, the event merging module 140 may determine whether any other event has occurred within a threshold amount of time of the merged event and within a threshold proximity of the location of the original event. The event merging module 140 may continue this process until no further temporal and spatial events are determined.

The event description data 342 comprises information indicative of one or more events 124. For example, the event description data 342 may comprise predefined profiles that designate movement of an item 104 from an inventory location 114 with the event 124 of "pick". The event description data 342 may be manually generated or automatically generated. The event description data 342 may include data indicative of triggers associated with events occurring in the facility 102. An event may be determined as occurring upon detection of the trigger. For example, sensor data 324 such as a change in weight from a weight sensor 120(6) at an inventory location 114 may trigger detection of an event of an item 104 being added or removed from the inventory location 114. In another example, the trigger may comprise an image of the user 116 reaching a hand toward the inventory location 114. In yet another example, the trigger may comprise two or more users 116 approaching to within a threshold distance of one another.

The event determination module 336 may process the sensor data 324 using one or more techniques including, but not limited to, artificial neural networks, classifiers, decision trees, support vector machines, Bayesian networks, and so forth. For example, the event determination module 336 may use a decision tree to determine occurrence of the "pick" event 124 based on sensor data 324. The event determination module 336 may further use the sensor data 324 to determine one or more tentative results 348. The one or more tentative results 348 comprise data associated with the event 124. For example, where the event 124 comprises a disambiguation of users 116, the tentative results 348 may comprise a list of possible user 116 identities. In another example, where the event 124 comprises a disambiguation between items 104, the tentative results 348 may comprise a list of possible item identifiers. In some implementations, the tentative result 348 may indicate the possible action. For example, the action may comprise the user 116 picking, placing, moving an item 104, damaging an item 104, providing gestural input, and so forth.

In some implementations, the tentative results 348 may be generated by other modules. For example, the tentative results 348 such as one or more possible identities or locations of the user 116 involved in the event 124 may be generated by the tracking module 332. In another example, the tentative results 348 such as possible items 104 that may have been involved in the event 124 may be generated by the identification module 334.

The event determination module 336 may be configured to provide a confidence level 344 associated with the determination of the tentative results 348. The confidence level 344 provides indicia as to the expected level of accuracy of the tentative result 348. For example, a low confidence level 344 may indicate that the tentative result 348 has a low probability of corresponding to the actual circumstances of the event 124. In comparison, a high confidence level 344 may indicate that the tentative result 348 has a high probability of corresponding to the actual circumstances of the event 124.

In some implementations, the tentative results 348 having confidence levels 344 that exceed the threshold result 346 may be deemed to be sufficiently accurate and thus may be used as the output data 126. For example, the event determination module 336 may provide tentative results 348 indicative of the three possible items 104(1), 104(2), and 104(3) corresponding to the "pick" event 124. The confidence levels 344 associated with the possible items 104(1), 104(2), and 104(3) may be 25%, 70%, 92%, respectively. Continuing the example, the threshold result 346 may be set such that confidence level 344 of 90% are deemed to be sufficiently accurate. As a result, the event determination module 336 may designate the "pick" event 124 as involving item 104(3).

In situations where the event determination module 336 determines that the confidence level 344 associated with the tentative result 348 is below a threshold result 346, the event merging module 140 and the inquiry module 338 may be utilized. For instance, the event merging module 140 may merge multiple event records when appropriate, as discussed above, and the inquiry module may seek input from a human user to determine a net result of the merged event.

The inquiry module 338 may be configured to use at least a portion of the sensor data 324 associated with the event 124 to generate inquiry data 350. In some implementations, the inquiry data 350 may include one or more of the tentative results 348 or supplemental data 352. The inquiry module 338 may be configured to provide inquiry data 350 to one or more devices associated with one or more human associates.

An associate user interface is presented on the respective devices of associates. The associate may generate response data 354 by selecting a particular tentative result 348, entering new information, indicating that they are unable to answer the inquiry, and so forth. The associate user interface is discussed in more detail below in FIGS. 8-11 and 17.

The supplemental data 352 comprises information associated with the event 124 or that may be useful in interpreting the sensor data 324. For example, the supplemental data 352 may comprise previously stored images of the items 104. In another example, the supplemental data 352 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 326 during presentation to an associate.

In one example, the edges of an object associated with the event may be determined in the image. For example, the OpenCV function "Canny" that implements the Canny Edge Detector algorithm may be used to determine the output of an item 104 or user 116 in the image. Once the edges have been determined, data specifying coordinates of a bounding box configured to encompass the edges of the object may be determined. For example, the coordinates for opposite corners of the bounding box may be designated as the pixels on the edge that are closets and farthest from an origin point in the image. The bounding box thus encompasses or surrounds the edges of the object. The supplemental data 352 may include the coordinates. The associate user interface 708 may then use these coordinates to render the bounding box on the device 706. In another implementation, the supplemental data 352 may be used to modify the portion of the image data 326 prior to delivery to the device 706. For example, the bounding box may be rendered and incorporated into the image data 326 prior to delivery to the device 706.

The inquiry module 338 processes the response data 354 provided by the one or more associates. The processing may include calculating one or more statistical results associated with the response data 354. For example, statistical results may include a count of the number of times associates selected a particular tentative result 348, determination of a percentage of the associates that selected a particular tentative result 348, and so forth.

The inquiry module 338 is configured to generate the output data 126 based at least in part on the response data 354. For example, given that a majority of the associates returned response data 354 indicating that the item 104 associated with the "pick" event 124 is item 104(5), the output data 126 may indicate that the item 104(5) was picked.

The inquiry module 338 may be configured to selectively distribute inquiries to particular associates. For example, some associates may be better suited to answering particular types of inquiries. Performance data, such as statistical data about the performance of the associates, may be determined by the inquiry module 338 from the response data 354 provided by the associates 702. For example, information indicative of a percentage of different inquiries in which the particular associate selected response data 354 that disagreed with the majority of associates may be maintained. In some implementations, test or practice inquiry data 350 having a previously known correct answer may be provided to the associate for training or quality assurance purposes. The determination of the set of associates to use may be based at least in part on the performance data.

By using the inquiry module 338, the event determination module 336 may be able to provide high reliability output data 126 that accurately represents the event 124. The output data 126 generated by the inquiry module 338 from the response data 354 may also be used to further train the automated systems used by the inventory management module 316. For example, the sensor data 324 and the output data 126, based on response data 354, may be provided to one or more of the modules of the inventory management system 316 for training in process improvement. Continuing the example, this information may be provided to an artificial neural network, Bayesian network, and so forth, to further train these systems such that the confidence level 344 and the tentative results 348 produced in the future for the same or similar input is improved.

Other modules 356 may also be present in the memory 310. For example, an accounting module may be configured to generate information indicative of a cost of goods picked by the user 116. Other data 358 may also be stored in the data store 318. For example, the other data 358 may comprise the cost of goods picked by the user 116, payment information, and so forth.

The server 204 may also include a power supply 360. The power supply 360 is configured to provide electrical power suitable for operating the components in the server 204.

Figure 4:
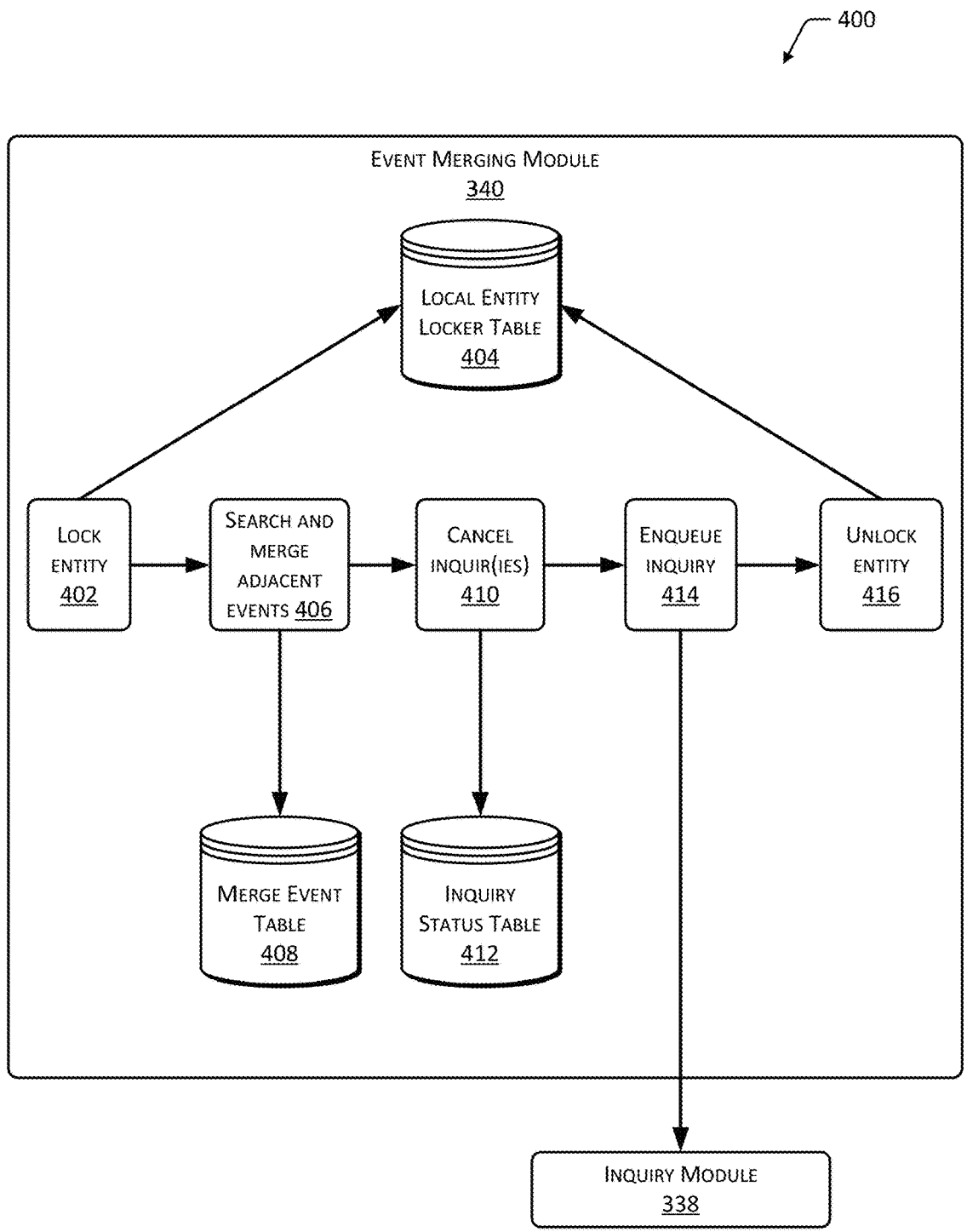
FIG. 4 illustrates a block diagram showing operation of the event merging module of FIG. 3.

FIG. 4 illustrates a block diagram 400 showing operation of the event merging module 340. The illustration of the block diagram 400 begins at a time when the event merging module 340 has received an indication of occurrence of an event that is associated with a tentative result that is less than the confidence level threshold. In response, at 402 the event merging module 340 locks the local entity that is associated with the location of the low-confidence event by sending a request to lock the entity to a local entity locker table 404. The local entity locker table 404 maintains information, in the form of event records, regarding events that occur within the facility at a particular entity, such as a particular shelf within the facility, a particular aisle, or the like. That is, the event merging module 340 may maintain a local entity locker table for each "entity" within the facility, such as each particular shelf in this example. Therefore, when the event merging module 340 receives an indication of a low confidence event that has occurred on a particular shelf, the module 340 may send the request to lock the shelf to appropriate local entity locker table 404.

Locking the shelf may result in the local entity locker table 404 refraining from changing any information with the table until the lock has been released. That is, the table 404 may refrain from adding new event records to the table 404, modifying existing event records, or the like until the lock is released. This allows the event merging module 340 time to determine whether the low-confidence event record is to be merged with one or more other event records.

At 406, the event merging module 340 searches for event records corresponding to adjacent events and, if appropriate merges the records associated with these events with the initial event record. That is, the event merging module 340 determines whether an additional event occurs on the same shelf (or within a predefined proximity to a location of the event in other examples) and within a threshold amount of time of the event (e.g., within one second, five seconds, one minute, etc.). If one or more such events are identified, then they may be merged with the low-confidence event. This may include storing information regarding the merged event in a merged event table 408 in the form of a merged event record. The merged event record may include information such as an indication of a starting time and ending time of the merged event, a location of the merged event, the tentative result of any of the individual events, or the like. Furthermore, after merging the low-confidence event with one or more additional events, the event merging module 340 may repeat the operation with reference to a new time of the merged event. That is, the module 340 may determine whether one or more events occur on the same shelf and within the threshold amount of time of either the starting time or the ending time of the merged event. The event merging module 340 may continue to merge event records until no such events are determined to have occurred on the same shelf as the initial event and with the threshold amount of time of the merged event.

At 410, the event merging module 340 cancels any inquiries that are in progress for individual event records corresponding to the sequence of now-merged events. For instance, the event merging module 340 may determine, with reference to an inquiry status table 412, whether any inquiry data had been sent to computing devices of one or more human associates regarding individual events of the merged events. If so, then the event merging module 340 cancels these inquiries, given that an inquiry for the entire merged event is to occur. Furthermore, if any results have already been associated with individual events of the merged event, these results may be disregarded. This may include deleting the results, sending an instruction to downstream systems to ignore these results, or the like.

At 414, the event merging module 340 enqueues an inquiry for the now-merged event record. That is, the event merging module 340 sends a request to the inquiry module 338 to send a user interface to one or more client computing devices to determine a net result of the merged event. After scheduling the inquiry, at 416 the event merging module 340 unlocks the local entity, thus allowing the creation of new event records on the same shelf or other local entity.

Figure 5:
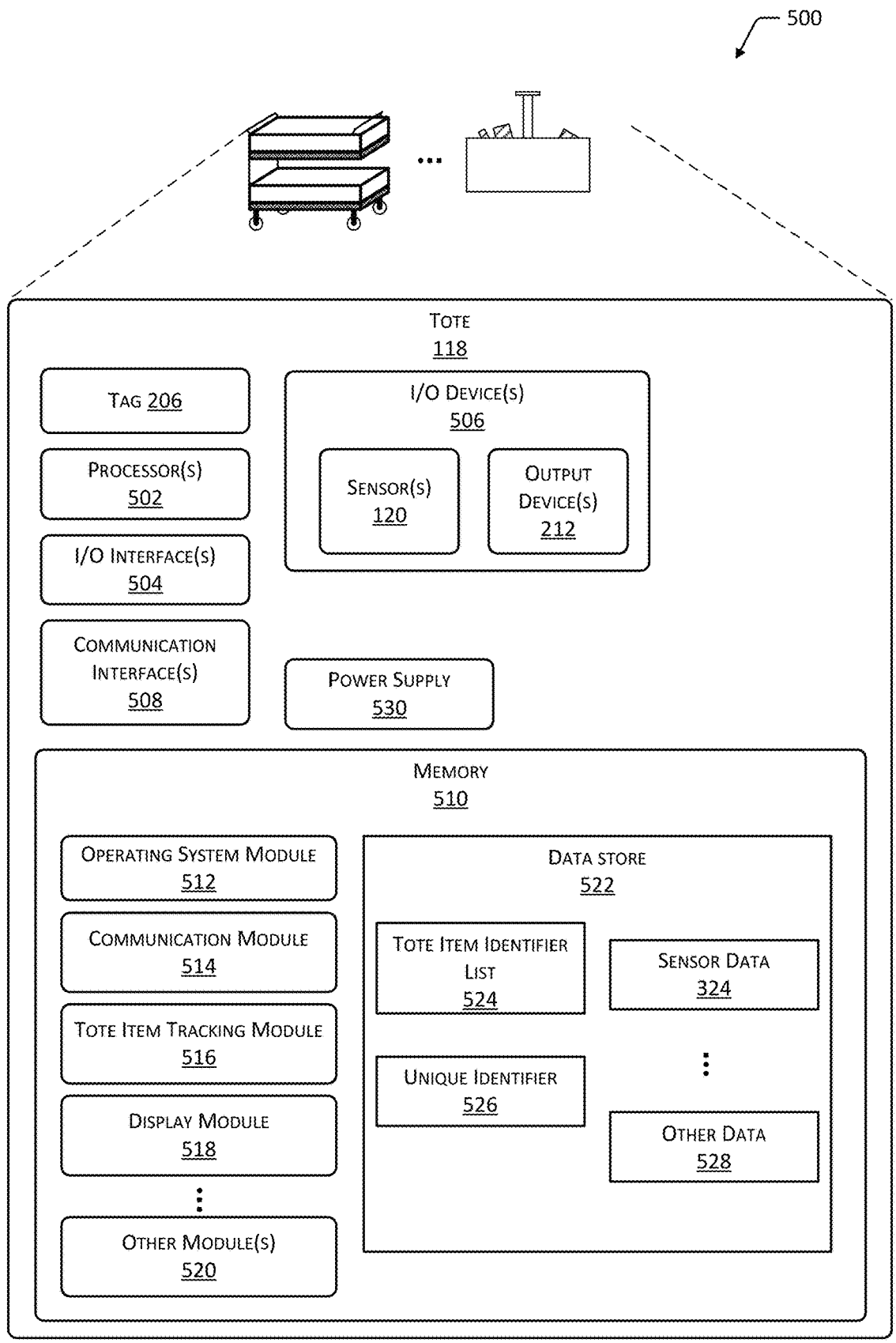
FIG. 5 is a block diagram of a tote.

FIG. 5 illustrates a block diagram 500 of the tote 118, according to some implementations. The tote 118 may include several form factors such as a wheeled cart, hand-carried cart, bag, and so forth. For example, the tote 118 may include a plurality of wheels enabling the tote 118 to be moved within the facility 102.

The tote 118 may include a tag 206. The tag 206 may be affixed to, integral with, or otherwise associated with the tote 118. In some implementations, the tote 118 may have identifiers, tags 206, or other indicia thereupon. For example, a machine-readable optical code, such as a barcode, may be affixed to a side of the tote 118.

The tote 118 may include one or more hardware processors 502 (processors) configured to execute one or more stored instructions. The processors 502 may comprise one or more cores. The tote 118 may include one or more I/O interface(s) 504 to allow the processor 502 or other portions of the tote 118 to communicate with other devices. The I/O interfaces 504 may include I2C, SPI, USB, RS-232, and so forth.

The I/O interface(s) 504 may couple to one or more I/O devices 506. The I/O devices 506 may include one or more of the input devices such as the sensors 120. As described above, the sensors 120 may include cameras 120(1), weight sensors 120(6), RFID readers 120(8), and so forth. The I/O devices 506 may also include output devices 212 such as display devices 212(1), audio output devices 212(2), haptic output devices 212(3), and so forth.

The tote 118 may also include one or more communication interfaces 508. The communication interfaces 508 are configured to provide communications between the tote 118 and other devices, such as other totes 118, interface devices, routers, access points 210, the servers 204, and so forth. The communication interfaces 508 may include devices configured to couple to PANs, LANs, WANs, and so forth. For example, the communication interfaces 408 may include devices compatible with Ethernet, Wi-Fi™, Bluetooth®, ZigBee®, Z-Wave, 3G, 4G, LTE, and so forth.

The tote 118 may also include one or more busses or other internal communications hardware or software that allow for the transfer of data between the various modules and components of the tote 118.

As shown in FIG. 5, the tote 118 includes one or more memories 510. The memory 510 comprises one or more CRSM as described above with regard to memory 310 on server 204. The memory 510 provides storage of computer readable instructions, data structures, program modules, and other data for the operation of the tote 118. A few example functional modules are shown stored in the memory 510, although the same functionality may alternatively be implemented in hardware, firmware, or as a SOC.

The memory 510 may include at least one OS module 512. The OS module 512 is configured to manage hardware resource devices such as the I/O interfaces 504, the I/O devices 506, the communication interfaces 508, and provide various services to applications or modules executing on the processors 502. The OS module 512 may implement a variant of the FreeBSD™ operating system as promulgated by the FreeBSD Project; other UNIX™ or UNIX-like variants; and a variation of the Linux™ operating system, such as Android® as promulgated by Google, Inc. of Mountain View, Calif., USA. Other OS modules 512 may be used, such as the Windows® operating system from Microsoft Corporation of Redmond, Wash., USA; the LynxOS® from LynuxWorks of San Jose, Calif., USA; and so forth.

One or more of the following modules may also be stored in the memory 510. These modules may be executed as foreground applications, background tasks, daemons, and so forth.

A communication module 514 may be configured to establish communications with one or more of the sensors 120, interface devices, the servers 204, or other devices. The communications may be authenticated, encrypted, and so forth.

The memory 510 may also store a tote item tracking module 516. The tote item tracking module 516 is configured to maintain a list of items 104, which are associated with the tote 118. For example, the tote item tracking module 516 may receive input from a user 116 by way of a touch screen display with which the user 116 may enter information indicative of the item 104 placed in the tote 118. In another example, the tote item tracking module 516 may receive input from the I/O devices 506, such as the weight sensor 120(6) and an RFID reader 120(8) or NFC. The tote item tracking module 516 may send the list of items 104 to the inventory management system 122. The tote item tracking module 516 may also be configured to receive information from the inventory management system 122. For example, a list of items 104 to be picked may be presented within a user interface on the display device 212(1) of the tote 118.

The memory 410 may include a display module 518. The display module 518 may be configured to present information, such as received from the one or more servers 204 or generated onboard the tote 118, using one or more of the interface devices. For example, the display module 518 may comprise a rendering engine configured to process the user interface data received from the server 204 to generate the user interface. In some implementations, the display module 518 may also process input made to the user interface by way of the input devices. In another implementation, the display module 518 may provide one or more of the functions described above with regard to the inventory management module 316.

Other modules 520 may also be stored within the memory 510. In one implementation, a data handler module may be configured to generate data indicative of the user 116, the tote 118, or another of one or more objects in range of the sensors 120 of the tote 118. The resulting sensor data 324 may be provided to the inventory management module 316. For example, image data 326 obtained from an camera 120(1) on the tote 118 may be provided by the inquiry module 338 to one or more associates.

The memory 510 may also include a data store 522 to store information. The data store 522 may use a flat file, database, linked list, tree, executable code, script, or other data structure to store information. In some implementations, the data store 522 or a portion of the data store 522 may be distributed across one or more other devices including the servers 204, other totes 118, network attached storage devices, and so forth.

The data store 522 may store a tote item identifier list 524. The tote item identifier list 524 may comprise data indicating one or more items 104 associated with the tote 118. For example, the tote item identifier list 524 may indicate the items 104 which are present in the tote 118. The tote item tracking module 516 may generate or otherwise maintain a tote item identifier list 524.

A unique identifier 526 may also be stored in the memory 510. In some implementations, the unique identifier 526 may be stored in rewritable memory, write-once-read-only memory, and so forth. For example, the unique identifier 526 may be burned into a one-time programmable, non-volatile memory, such as a programmable read-only memory (PROM). In some implementations, the unique identifier 526 may be part of a communication interface 508. For example, the unique identifier 526 may comprise a media access control (MAC) address associated with a Bluetooth® interface.

The data store 522 may also store sensor data 324. The sensor data 324 may be acquired from the sensors 120 onboard the tote 118.

Other data 528 may also be stored within the data store 522. For example, tote configuration settings, user interface preferences, and so forth, may be stored in the data store 522.

The tote 118 may also include a power supply 530. The power supply 530 is configured to provide electrical power suitable for operating the components in the tote 118. The power supply 530 may comprise one or more of photovoltaic cells, batteries, wireless power receivers, fuel cells, capacitors, and so forth.

Figure 6:
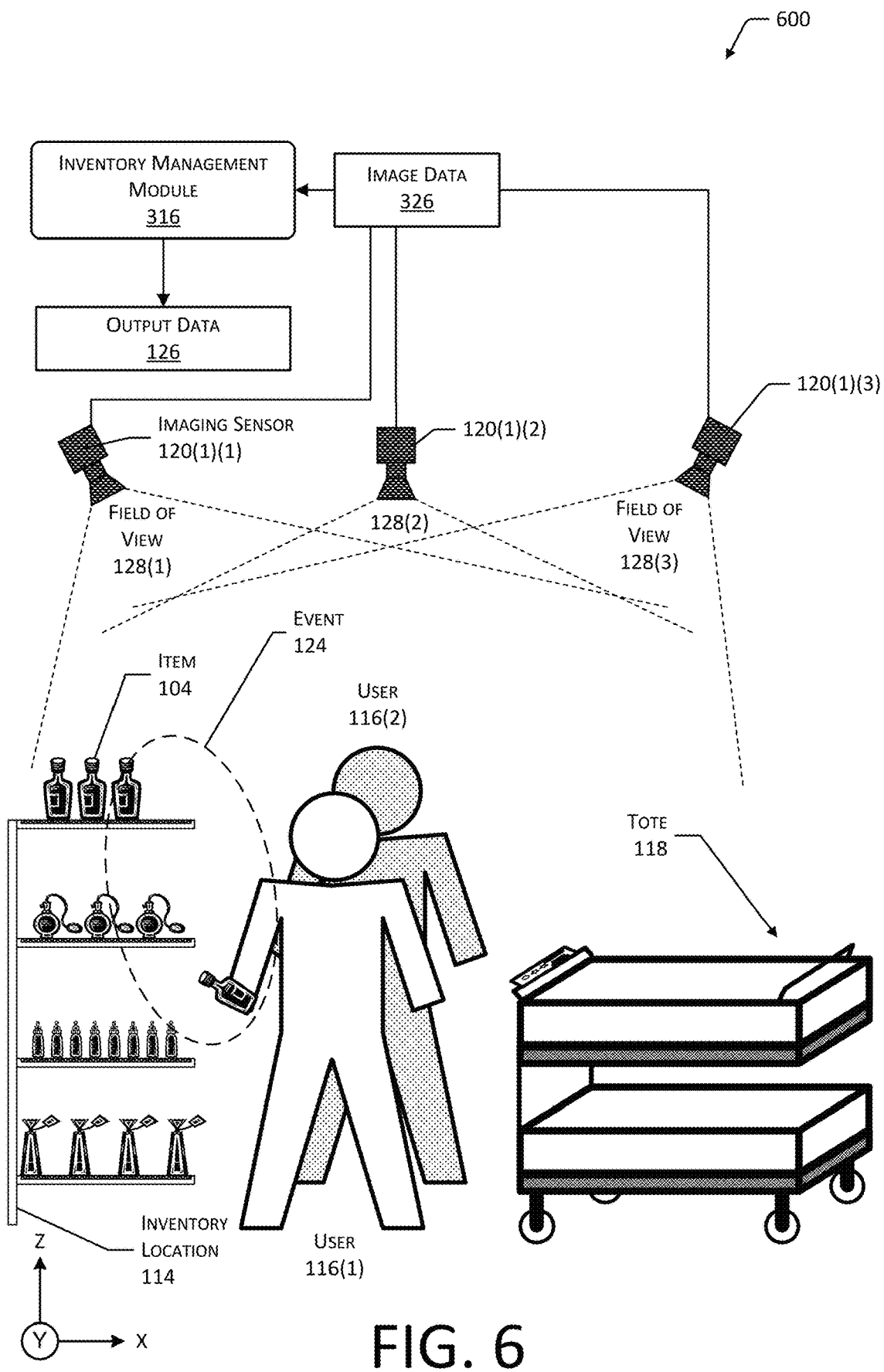
FIG. 6 illustrates cameras configured to acquire sensor data in the facility. This sensor data corresponds to one or more events, which may be merged in some instances.

FIG. 6 illustrates a side view 600 of cameras 120(1) configured to acquire image data 326 in the facility 102, according to some implementations. The image data 326 may include images of items 104, inventory locations 114, users 116, totes 118, and other objects.

In some implementations, such as depicted here, the facility 102 may include one or more sensors 120 that are configured to acquire data from an overhead vantage point. The sensors 120 may include, but are not limited to, one or more of the cameras 120(1), the 3D sensors 120(2), the microphones 120(5), the RFID readers 120(8), the RF receivers 120(9), and so forth. As described above, the cameras 120(1) have a field of view 128.

In this illustration, the cameras 120(1)(1), 120(1)(2), and 120(1)(3) are arranged overhead relative to the user 116 and are configured to generate the image data 326. The respective fields of view 128(1)-(3) depicted here include an inventory location 114, one or more items 104, the users 116(1) and 116(2), and the tote 118. The sensor data 324, including the image data 326, may be provided to the inventory management system 122. For example, non-camera data 328 acquired from one or more weight sensors 120(6) of the inventory locations 114 may be provided to the inventory management module 316.

The inventory management module 316 executing on the server 204 may process the sensor data 324 to determine occurrence of an event 124. For example, based on the sensor data 324, the event determination module 336 may determine that the event 124 comprising a "pick" of an item 104 has occurred. However, given the proximity of the user 116(2) to the user 116(1), the event determination module 336 may have a low confidence level 344 as to which of the users 116 picked the item 104. Where the low confidence level 344 is below the threshold result 346, the event determination module 336 may utilize the inquiry module 338. Furthermore, the event merging module 340 may determine whether merge the low-confidence event record with one or more other event records, as discussed in further detail with regards to FIGS. 15-20.

In the instant example where no merging occurs, the inquiry module 338 may generate inquiry data 350 including a least a portion of the sensor data 324 associated with the event 124. The inquiry data 350 may be sent to one or more associates as described below with regard to FIG. 7. The response data 354 may be received from the one or more associates, and based thereon, the output data 126 may indicate that the user 116(1) was responsible for the "pick" of the item 104.

Figure 7:
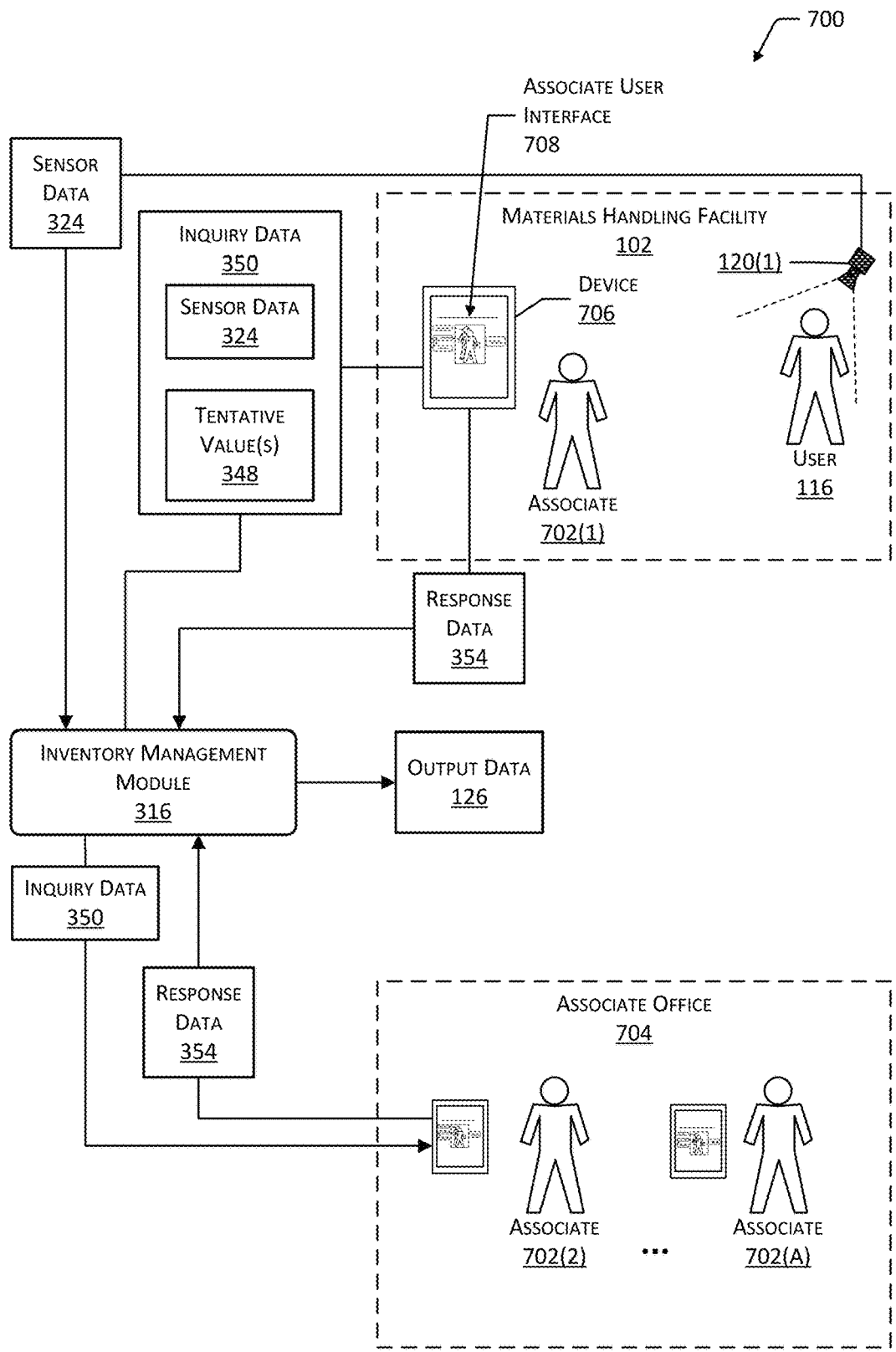
FIG. 7 illustrates a block diagram of distributing inquiry data to associates to generate response data that is used to generate output data. In some instances, the inquiry data corresponds to a merged event.

FIG. 7 illustrates a block diagram 700 of distributing inquiry data 350 to associates to generate response data 354 that is used to generate output data 126, according to implementations. As will be appreciated, the description of the block diagram is equally applicable to distributing inquiry data 350 corresponding to a single event, as well as to a merged event comprising a sequence of events.

One or more associates 702(1), 702(2), . . . , 702(A) may be present at one or more locations. For example, some associates 702 may be present at the facility 102. As depicted here, associates 702(1) is on-site at the facility 102. Other associates 702 may be elsewhere, such as at an associate office 704.

Each associates 702 may have one or more devices 706 with which they may process inquiry data 350. One or more devices 706 may comprise smartphones, tablet computers, personal computers, laptop computers, set-top boxes, and so forth. The device 706 is able to present an associate user interface 708. The associate user interface 708 is described in more detail below with regard to FIGS. 8-11 and 17.

As described above, one or more sensors 120 in the facility 102 provide sensor data 324 to the inventory management module 316. As described above, the inventory management module 316 may process the least a portion of sensor data 324. For example, the event determination module 336 may determine the occurrence of an event 124 and one or more tentative results 348 associated with the event 124. In situations where the tentative results 348 are below a threshold result 346, or special circumstances call for human processing, the inquiry module 338 may generate the inquiry data 350 for the event or for a merged event.

As described above, the inquiry data 350 comprises at least a portion of the sensor data 324 and may also include one or more of the tentative results 348. Inquiry data 350 is received by the device 706 and presents the associate user interface 708. The associate 702 provides input using the associate user interface 708 and the device 706 returns response data 354 to the inventory management module 316. As described above, the inventory management module 316 may process the response data 354 obtained from one or more associates 702 to generate the output data 126.

In some implementations, the distribution of inquiry data 350 to particular associates 702 or sets of associates 702 may be based at least in part on service level or service level agreements (SLAs) associated with the facility 102. For example, a SLA may specify a response time such that that the output data 126 for pick events 124 is to be determined in less than 20 seconds after the occurrence of an event 124. In another example, the service level may specify a response time to return the response data 354. In such situations, the inquiry data 350 may be directed to the associate 702(1), who is on-site at the facility 102 and thus has high-bandwidth access using the local area network of the facility 102 to access the sensor data 324. In another example, the SLA may specify that the response data 354 or the output data 126 associated with receiving items 104 at the facility 102 is to be determined in less than 15 minutes. In this example, the inquiry data 350 may be sent to the off-site associate 702(2) at the associate office 704, who has relatively smaller bandwidth access to the sensor data 324. A threshold level of time may thus be used to determine whether to use the associates 702 on-site or off-site.

In some implementations, the inquiry data 350 may include at least a portion of the sensor data 324, or the inquiry data 350 may comprise retrieval data associated with the sensor data 324. For example, the retrieval data may comprise a uniform resource identifier that may be used to access image data 326 stored on the server 204.

Figure 8:
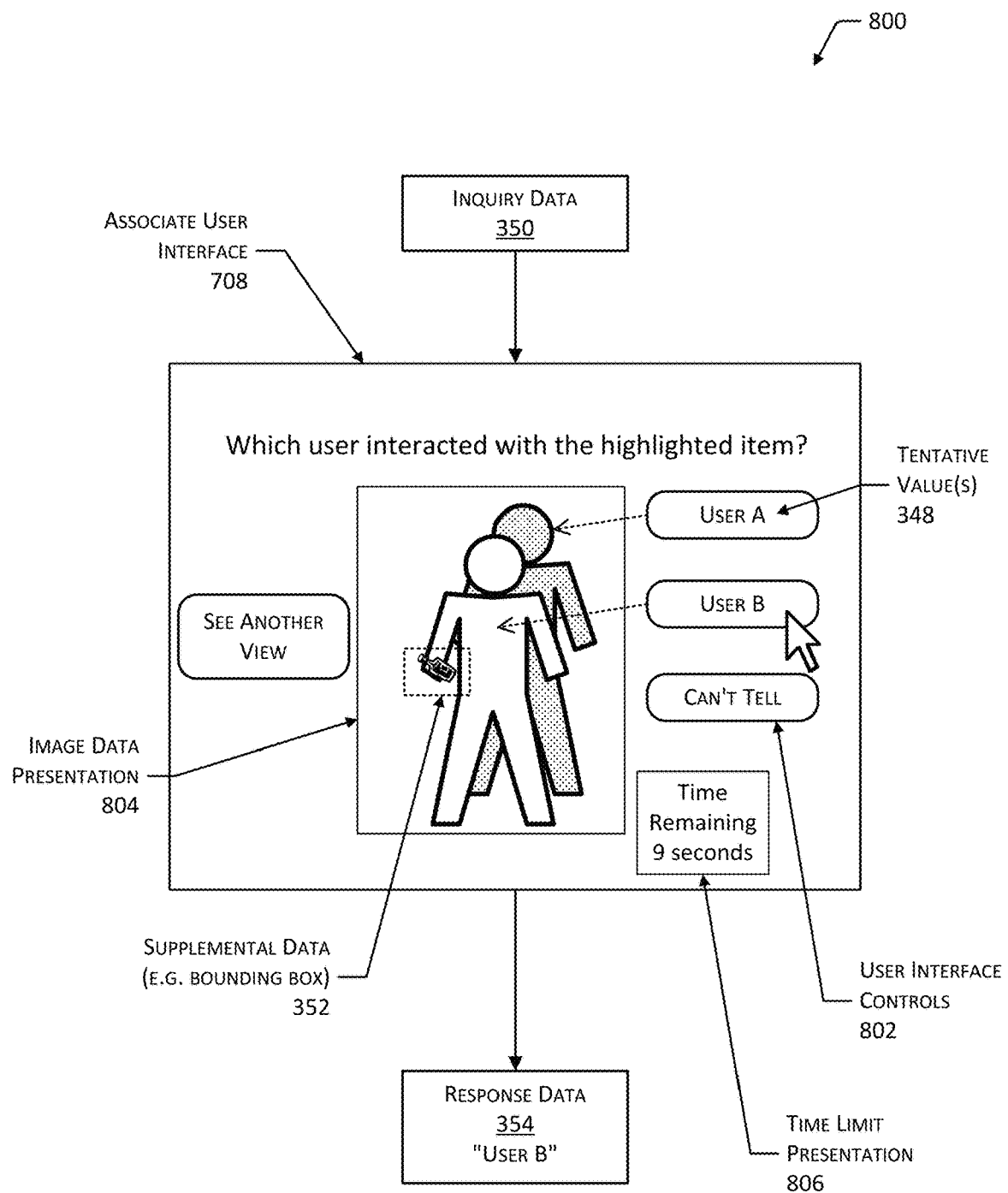
FIG. 8 illustrates an associate user interface configured to present image data to an associate to generate response data associating an item interaction with a particular user of the facility.

FIG. 8 illustrates an example 800 of an associate user interface 708 configured to present image data 326 to an associate 702 to generate response data 354 associating an item interaction with a particular user 116 of the facility 102, according to some implementations.

In some implementations, the inventory management module 316 may be unable to automatically determine which of a plurality of users 116 interacted with an item 104. In such a situation, the inventory management module 316 may be configured to generate inquiry data 350. The inquiry data 350 may be provided to one or more devices 706 for processing by one or more associates 702. The processing may utilize an associate user interface 708 such as that depicted in FIG. 8.

The associate user interface 708 may include one or more user interface controls 802 and image data presentation 804 elements. The user interface control 802 may be associated with the tentative results 348. In this example, the user interface controls 802 comprise buttons that may be selected by the associate 702. The user interface control 802 may include additional controls such as a "can't tell" indicating that the associate 702 is unable to provide input, or a "see another view" configured to provide image data 326 from a different camera 120(1). In some implementations, other controls may be available to the associate 702 in the associate user interface 708. For example, image manipulation controls may allow the associate 702 to zoom, minimize, change contrast, sharpen, fast forward or rewind, and so forth.

In some implementations, the image data presentation 804 may have initial settings configured to assist the associate 702 in quickly completing the inquiry. For example, the image data presentation 804 may default to playing back a video clip at one half speed or stepping through a series of still images at one frame per second. As described above, image manipulation controls may allow the associate 702 to change this presentation.

The image data presentation 804 allows the image data 326 associated with the event 124 to be presented to the associate 702. For example, the image data presentation 804 may comprise presentation of one or more still images, video, or a combination thereof.

As described above, the supplemental data 352 may comprise one or more graphical elements. For example, the supplemental data 352 may comprise a bounding box or highlight configured to draw the attention of the associate 702 to a particular portion of the image. The supplemental data 352 may be incorporated into the image data 326 at the server 204. The supplemental data 352 may also be overlaid or presented by the device 706 during presentation of the associate user interface 708. For example, the inquiry data 350 may include data indicative of the placement of the bounding box with respect to the image data 326 being presented in the associate user interface 708.

Once the associate 702 selects a particular user interface control 802 designating one or more of the tentative results 348, the associate user interface 708 may generate data that is used by the device 806 to generate the response data 354. In this example, the associate 702 has selected that the user "B" was the one who interacted with the item 104.

In some implementations instead of the tentative results 348, labels associated with the tentative results 348 may be presented to the associate 702. The labels may be used to anonymize or protect information, such as the users 116 depicted in the image data 326 such that the associate 702 is unaware of the underlying information. For example, the associate user interface 708 as depicted in FIG. 8 provide user interface control 802 using labels designating "User A" and "User B" rather than identifying information such as the names or unique identifiers of the users 116, such as "User 116(1)" and "User 116(2)".

In some implementations, the sensor data 324 may be modified as well to protect privacy of the users 116. For example, faces or a portion thereof of the users 116 as depicted in the image data 326 may be obscured during presentation in the associate user interface 708.

The associate user interface 708 may be configured to maximize the throughput of the associate 702 with regard to responding to inquiry data 350. For example, the image data presentation 804 may begin playback immediately and may loop playback of video image data 326 continuously until the associate 702 selects one of the user interface controls 802.

In one implementation, the inquiry module 338 may prioritize the image data 326 presented by the associate user interface 708 based on one or more criteria. For example, the criteria may include, but is not limited to, distance between the location of the event 124 and the camera 120(1), presence of an obscuring object such as another user 116 within the image data 326, image blur present in the image data 326, and so forth. Continuing the example, the inquiry module 338 may be configured to generate inquiry data 350 that first presents image data 326 that is provided by the closest camera 120(1) with respect to the location. Should the associate 702 activate the user interface control 802 to "see another view", the image data presentation 804 may present the video acquired by the next closest camera 120(1).

A time limit presentation 806 may also be presented in the associate user interface 708. The time limit presentation 806 may provide an indicator to the associate 702 as to the time remaining to respond to the inquiry. In some implementations, time limit data may be included in the inquiry data 350. In other implementations, responses exceeding the time limit may be disregarded or given reduced importance in determining the output data 126. For example, responses that take too long to be provided may be deemed unreliable due to indecision on the part of the associate 702.

Figure 9:
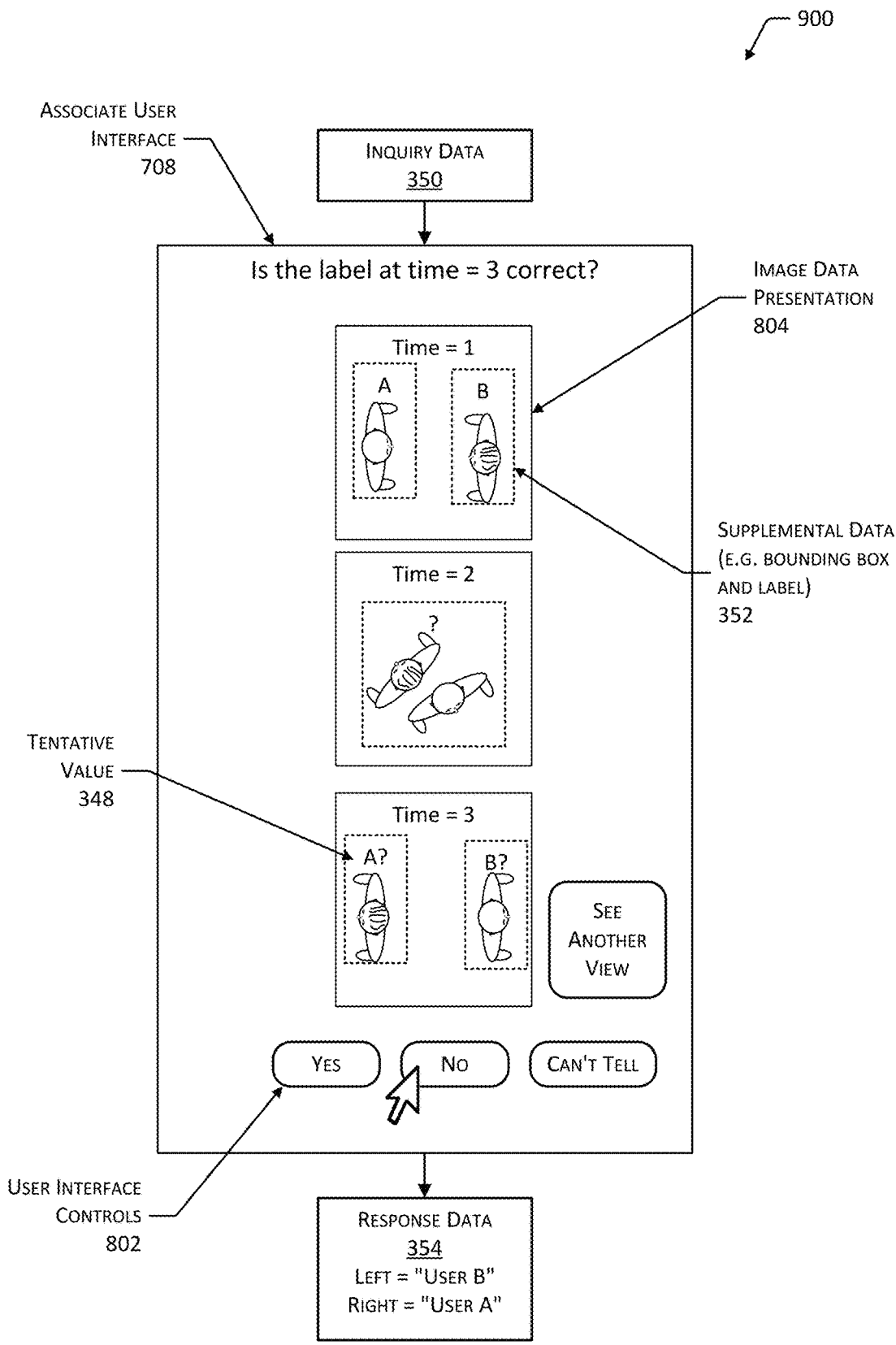
FIG. 9 illustrates an associate user interface configured to present image data to an associate to generate response data disambiguating two users of the facility.

FIG. 9 illustrates an example 900 of an associate user interface 708 configured to present image data 326 to an associate 702 to generate response data 354 disambiguating two users 116 of the facility 102, according to some implementations.

In some implementations, the inventory management module 316 may be unable to automatically determine the identity of one user 116(1) after being in close proximity to another user 116(2). For example, as users 116(1) and 116(2) move together to a common location in the facility 102, the tracking module 332 may be unable to determine which user 116 exited to the left and which user 116 exited to the right of that common location after moving apart.

As above, the associate user interface 708 may comprise user interface controls 802 and image data presentation 804. In this illustration, a series of still images are presented as acquired at successive times 1, 2, and 3 depicting two users 116(1) and 116(2) passing one another in the aisle 112. In another implementation, the image data 326 comprising video of the event 124 may be presented.

The image data presentation 704 includes the image data 326 acquired from an overhead camera 120(1) as well as supplemental data 352, such as a bounding box around each of the users 116 and a label for each of the users 116, as depicted in FIG. 9.

In this figure, the associate 702 is presented with user interface controls 802 to indicate "Yes" or "No" as to whether the automatically generated tentative results 348 at time=3 are correct. To protect the identity of the users 116, the tentative results 348 have been replaced with anonymous labels.

In this illustration, the associate 702 responds with a "No" selection, indicating that at time=3 the label incorrectly attributes the user 116 on the left as "A" and the user 116 on the right as "B". The response data 354 thus indicates that the user 116 on the left of the image is "B" and the user 116 on the right of the image is "A".

In another implementation, the associate user interface 708 may omit the presentation of tentative results 348. For example, the associate 702 may be instructed to drag or click of the initial bounding box around one of the users 116 and click on the corresponding image of the user 116 at the subsequent time.

Figure 10:
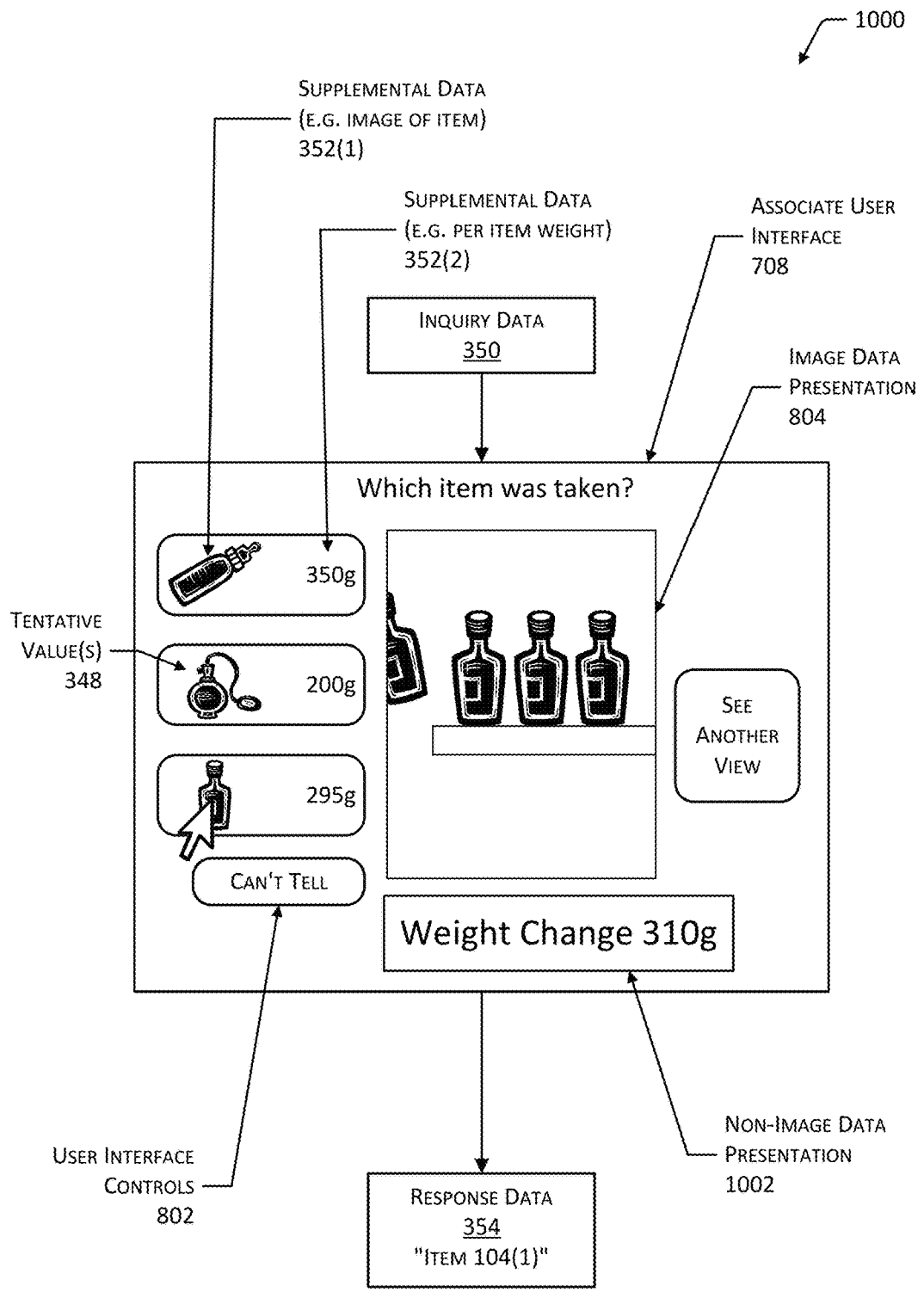
FIG. 10 illustrates an associate user interface configured to present image data and non-image data to generate response data identifying an item removed from an inventory location.

FIG. 10 illustrates an example 1000 of an associate user interface 708 configured to present image data 326 and non-image data 328 to generate response data 354 identifying an item 104 removed from an inventory location 114, according to some implementations.

As described above, the associate user interface 708 may comprise user interface controls 802 and image data presentation 804. For example, the image data presentation 804 may comprise a still image acquired during the event 124. The user interface controls 802 are configured to present the tentative results 348 using supplemental data 352(1) and supplemental data 352(2). The supplemental data 352(1) comprises images of the item 104, such as obtained from the item data 322 stored in the data store 318. The supplemental data 352(2) may comprise the per item weight, such as also obtained from the item data 322.

Non-image data presentation 1002 presents at least a portion of the non-image data 328 associated with the event 124. The non-image data presentations 1002 may comprise text, numbers, or graphical elements. As depicted here, the non-image data presentation 1002 depicts the non-image data 328 indicative of a weight change as measured by the weight sensor 120(6) of the inventory location 114 associated with the event 124.

The inquiry module 338 may be configured to include additional information such as the non-image data 328 in the inquiry data 350. For example, in the situation where the items 104 involved have the same or similar packaging but are provided in different weights, weight data associated with the event 124 may be used.

As described above, the associate 702 may select one or more of the user interface controls 802. Responsive to the selection, the device 706 may generate response data 354. For example, the response data 354 associated with the event 124 depicted in this figure indicates that the item 104 that was taken is item 104(1).

Figure 11:
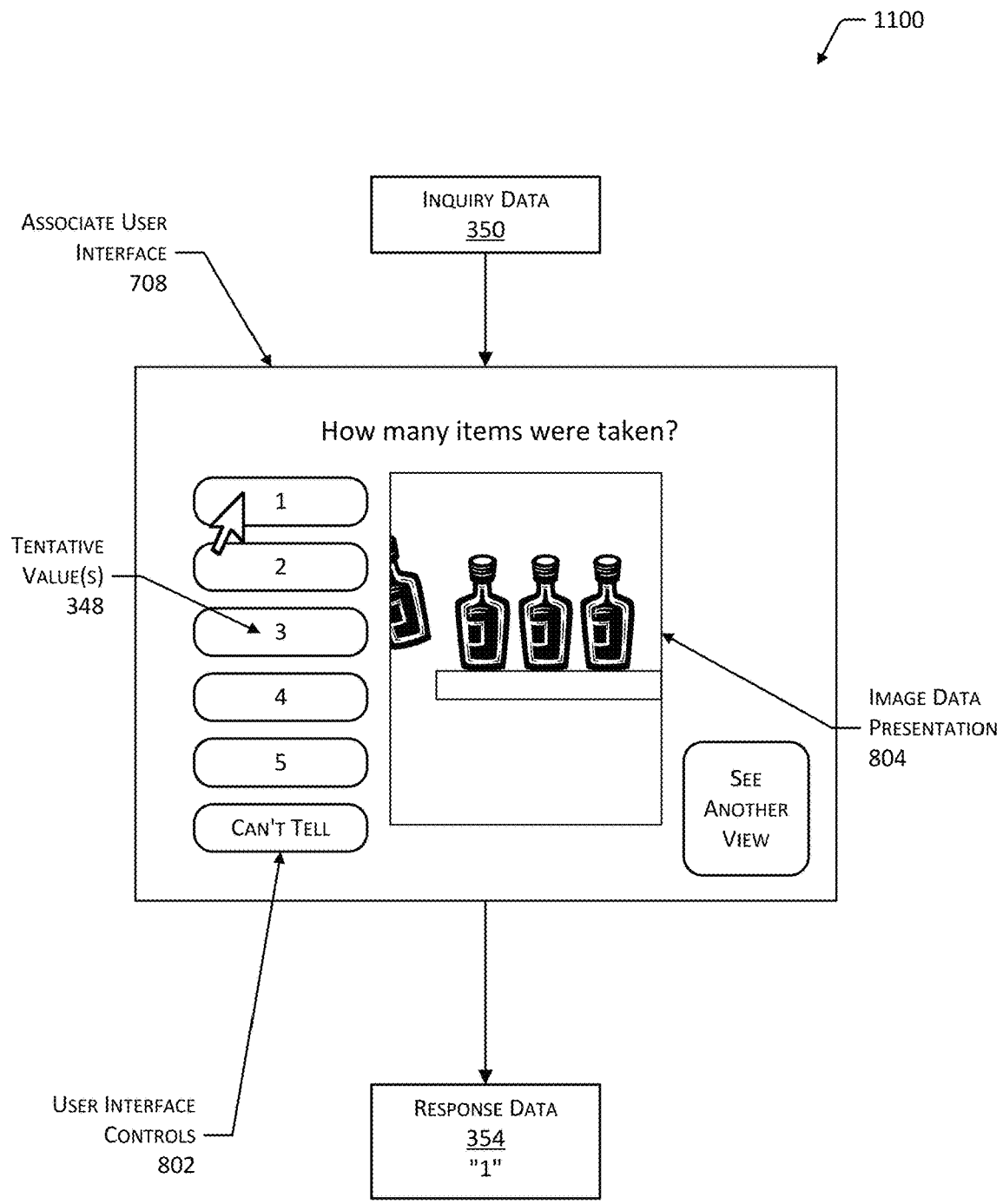
FIG. 11 illustrates an associate user interface configured to present image data and non-image data to generate response data identifying a quantity of items removed from an inventory location.

FIG. 11 illustrates an example 1100 of an associate user interface 708 configured to present image data 326 and non-image data 328 to generate response data 354 identifying a quantity of items 104 removed from an inventory location 114, according to some implementations.

As described above, the associate user interface 708 may comprise user interface controls 802 and image data presentation 804. For example, the image data presentation 804 may comprise a video acquired during the event 124, such as the user 116 removing an item 104 from the inventory location 114.

The tentative results 348 depicted here comprise numerical quantities that may have been picked from the inventory location 114. The associate 702 may view the image data presentation 804 and make a selection from the user interface controls 802. The resulting response data 354 may then be provided to the inventory management module 316. As a result of the response data 354, the inventory management module 316 may generate output data 126 correctly indicating that the user 116 picked one item 104 from the inventory location 114, as depicted in this figure.

In other implementations, the associate user interface 708 may be used to provide response data 354 for other events 124. For example, the event 124 may comprise an apparent movement of an inventory location 114 within the field of view 128 of an camera 120(1). The associate user interface 708 may be configured to acquire from the associate 702 information indicative of where the corners or other features on the inventory location 114 are within image data 322. Using this information, the inventory management module 316 may recalibrate the camera 120(1).

In another implementation, the associates 702 may be used to compensate for failure of one or more other sensors 120. For example, the weight sensor 120(6) at an inventory location 114 may fail. Responsive to this failure, events 124 involving the inventory location 114 having the failed or suspect weight sensor 120(6) may be processed by the inquiry module 338 to receive input from the associates 702.

In still another implementation, an event record corresponding to the event 124 may be processed to determine marketing data. For example, the event 124 of the user 116 interacting with an item 104 may be processed using the inquiry module 338 to categorize the event 124, such as whether the user 116 exhibited a favorable, neutral, or unfavorable facial expression while interacting with the item 104.

Figure 12:
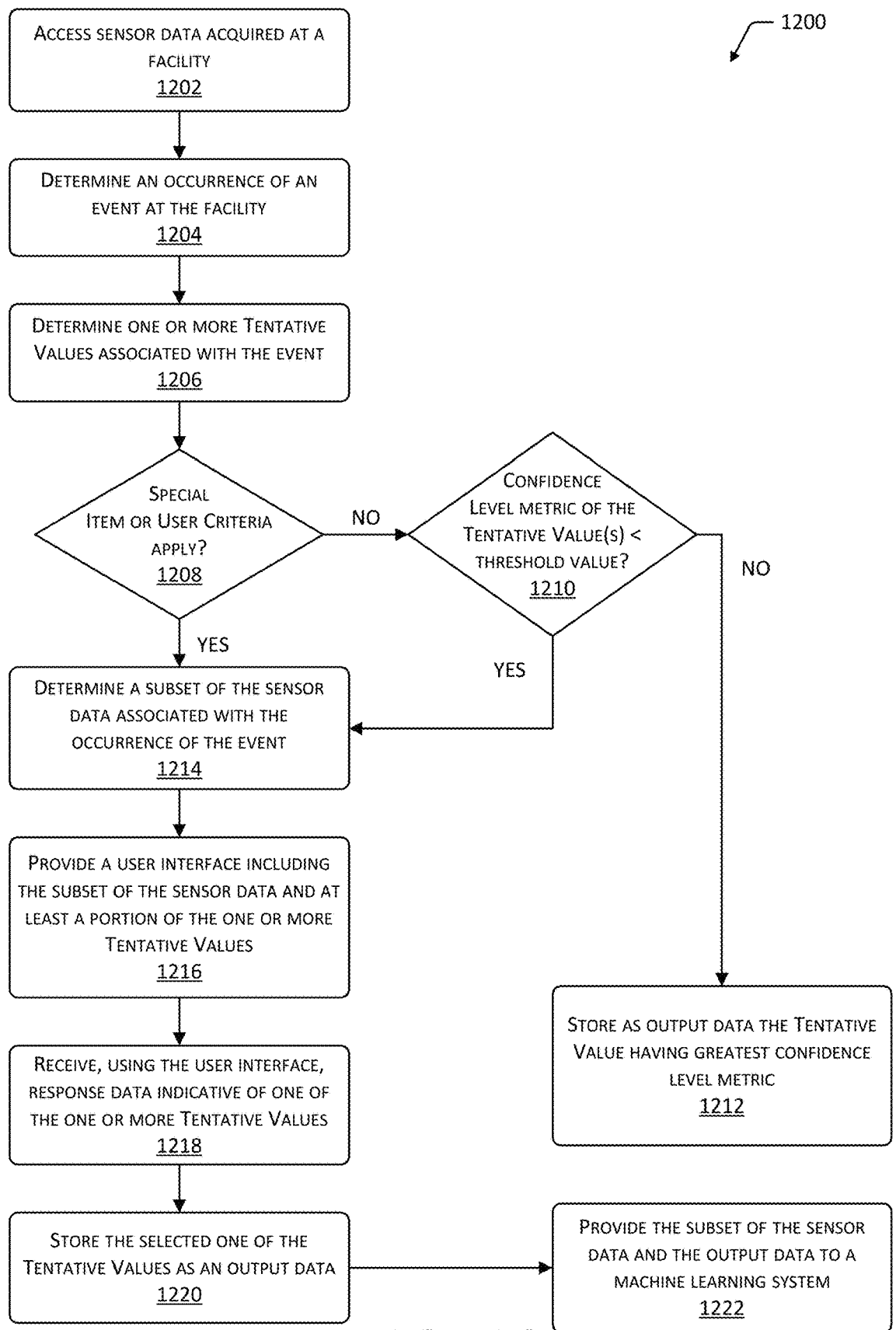
FIG. 12 depicts a flow diagram of a process for generating output data from response data.

FIG. 12 depicts a flow diagram 1200 of a process for generating output data 126 from response data 354 without regarding to the merging of events, according to some implementations. A flow diagram 1800 described with reference to FIGS. 18-20 describes in detail a process for generating output data 126 from response data 354 corresponding to a merged event.

Block 1202 accesses sensor data 324 acquired at the facility 102. For example, sensor data 324 may comprise image data 326 acquired from one or more cameras 120(1).

Block 1204 determines an occurrence of an event 124 at the facility 102. For example, the event determination module 336 may identify an item 104 picked from an inventory location 114, that two users 116 have passed within a threshold distance of one another, and so forth. In another example, the event determination module 336 may determine that an camera 120(1) has been displaced or an inventory location 114 has been moved.

Block 1206 determines one or more tentative results 348 associated with the an event record corresponding to event 124. For example, when the event 124 comprises a user 116 interacting with an item 104, the event determination module 336 may generate, using the sensor data 324, tentative results 348 comprising a list of the item 104 identifiers that may be depicted in the image data 326.

In another example, where the event 124 comprises a plurality of users 116 moving towards one another, the plurality of tentative results 348 may comprise user identifiers indicative of identities of the plurality of users 116.

Block 1208 determines if one or more of special item 104 or user 116 criteria apply. In some implementations, particular items 104, or categories or classes of items 104, may be designated for special handling. For example, particular items 104 may be restricted to picking by users 116 who are over a threshold age. In other implementations, particular users 116 or categories of users 116 may be designated for special handling. For example, a user 116 who is on a performance improvement plan for an unusually high number of picking errors may be designated for special handling. When special criteria does not apply, the process may proceed to block 1110. When special criteria does apply, the process may proceed to block 1114.

Block 1210 determines if a confidence level 344 of the one or more tentative results 348 is below a threshold result 346. For example, the confidence level 344 for each of the tentative results 348 may be determined. Of all the tentative results 348, the tentative result 348 having the greatest confidence level may be determined. When the confidence level 344 of the one or more tentative results 348 (or a particular one, such as a particular tentative result 348 having a greatest confidence level 344) is greater than or equal to the threshold result 346, the process may proceed to block 1112. When the confidence level 344 is less than the threshold result 346, the process may proceed to block 1114. Continuing the example, the tentative result 348 having the greatest confidence level 344 may be less than the threshold result.

In other implementations, other techniques such as a set of one or more heuristics may be used to determine when to process the sensor data 324 using the associates 702. For example, rules or heuristics may designate particular events, such as two users 116 moving proximate to one another, as events 124, requiring resolution using the associates 702.

Block 1212 stores as output data 126 the tentative result 348 having the greatest confidence level 344. For example, the automated system may be able to identify the item 104 that was picked from the inventory location 114 with a confidence level 344 that is high enough to not call for human intervention, and may use that tentative result 348.

Block 1214 is configured to determine a subset of the sensor data 324 associated with the occurrence of the event 124. For example, the subset may comprise image data 326 such as video acquired starting at a time before the event 124 and ending at a time after the conclusion of the event 124.

In some implementations, the subset may be determined at least in part by the physical layout data 320. For example, the physical layout data 320 may comprise camera data indicating a location and orientation of one or more of the cameras 120(1). Continuing the example, the subset may comprise image data 326 acquired from the cameras 120(1) that have the location of the event 124 within their respective fields of view 128.

Block 1216 provides an associate user interface 708. As described above, the associate user interface 708 may be generated using inquiry data 350. The associate user interface 708 may present the subset of the image data 326. In some implementations, the associate user interface 708 may present at least a portion of the one or more tentative results 348. As described above, such as with regard to FIG. 8, the associate user interface 708 may include one or more user interface controls 802. The associate 702 may activate one or more of the user interface controls 802 to select one of the tentative results 348 presented.

In some implementations, one or more of the tentative results 348 may be intentionally erroneous. For example, these intentionally erroneous tentative results 348 may be injected into the inquiry process to ascertain whether the associate 702 is adequately performing the selection.

As described above, in some implementations, the associate user interface 708 may present supplemental data 352. For example, where the event 124 comprises the user 116 interacting with an item 104, the supplemental data 352 may comprise previously stored images of the items 104 indicated by the item identifiers in the tentative results 348. In another example, where the event 124 comprises several users 116 moving towards one another, the supplemental data 352 may comprise previously stored images of the users 116 as indicated by the user identifiers in the tentative results 348.

In some implementations, instead of, or in addition to providing the user interface, other actions may be taken. For example, the inventory management module 316 may dispatch an associate 702 who is at the facility 102 to the location in the facility 102 at which the event 124 occurred. The associate 702 may be equipped with one or more sensors 120, such as a wearable camera 120(1). Based at least in part on the image data 326 acquired from the camera 120(1) carried by the associate 702, the inventory management module 316 may be able to automatically determine the output data 126. In another implementation, the associate 702 carrying the camera 120(1) may be presented with the associate user interface 708 and may provide response data 354.

Block 1218 receives, from the associate user interface 708, response data 354 indicative of a selection of one or more tentative results 348. In some implementations, the response data 354 may indicate no match, that the information provided is insufficient to answer the inquiry, and so forth.

Block 1220 stores the selected one of the tentative results 348 as the output data 126. For example, the inquiry module 338 may determine the tentative result 348 that was selected by a majority of the associates 702 and designate the majority selected tentative result 348 as the output data 126.

The output data 126 may be used for a variety of purposes. For example, the output data 126 may be used to bill a particular account. In another example, the output data 126 may be used to calibrate the camera 120(1). For example, the output data 126 may comprise an indication by the associate 702 of particular points (such as the corners) of an inventory location 114. This output data 126 may then be used to recalibrate the image data 326 from the camera 120(1).

Block 1222 may provide the subset of the sensor data 324 and the output data 126 to the machine learning system that generated the tentative results 348 or to another machine learning system. The machine learning system may then be trained or otherwise updated using the sensor data 324 and the corresponding output data 126 produced from the response data 354, potentially improving accuracy over time. For example, the sensor data 324 and the output data 126 may be designated as training data. Continuing the example, where the machine learning system uses OpenCV, the training data may be used to modify or create new Bayesian classifiers using the function "CvNormalBayes-Classifier::train". Different machine learning systems may use different processes for training.

Figure 13:
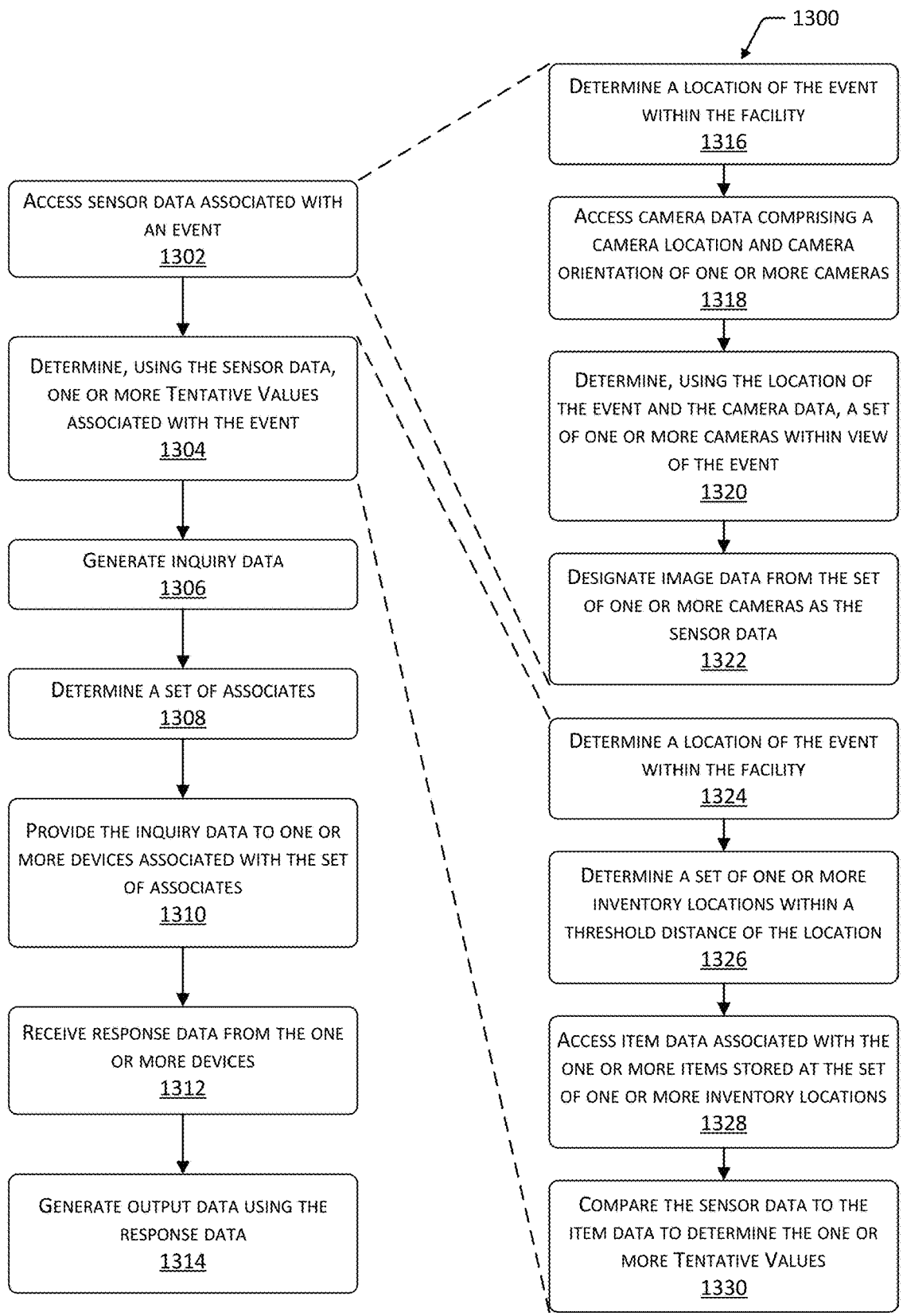
FIG. 13 depicts a flow diagram of another process for generating output data from response data.

FIG. 13 depicts a flow diagram 1300 of another process for generating output data 126 from response data 354, according to some implementations.

Block 1302 accesses sensor data 324 associated with an event 124. For example, the image data 326 acquired by cameras 120(1) to have a field of view 128 directed towards the location of the event 124 may be accessed.

Block 1304 determines, using the sensor data 324, one or more tentative results 348 associated with the event 124. For example, the event determination module 336 may generate a list of possible item identifiers, user identifiers, actions taken by the user 116, and so forth. For example, the tentative results 348 may comprise the actions of "picking an item", "placing and item", or "damaging an item".

In some implementations, the determination of the tentative results 348 may use one or more machine learning systems. For example, the tentative results 348 may be generated by processing sensor data 324 with one or more of artificial neural networks, classifiers, decision trees, support vector machines, Bayesian networks, and so forth.

Block 1306 generates inquiry data 350. For example, the inquiry module 338 may access the subset of the sensor data 324 that is associated with the event 124. In some implementations, the inquiry data 350 may include one or more of the tentative results 348 or data associated with the tentative results 348, such as anonymized labels.

In some implementations, generation of the inquiry data 350 may be responsive to the determination that the confidence levels 344 of the tentative result(s) 348 are below a threshold result 346. For example, determination that the confidence levels 344 are below a threshold result 346 such as 97% may result in the generation of the inquiry data 350 and subsequent process described below.

Block 1308 determines a set of associates 702. For example, given a type of the event 124, the list of associate 702 that are available to process inquiries may be filtered to those associates 702 having a requisite level of experience in resolving inquiries of the given type.

Block 1310 provides the inquiry data 350 to one or more devices 706 associated with the set of associates 702. For example, the inquiry data 350 may be placed into a work queue that is pulled by an application executing on the devices 706, or the inquiry data 350 or an indicator thereof may be pushed to the one or more devices 706 using one or more networks 202.

As described above, in some implementations, the set of associates 702 may be determined using information such as the location of the associate 702. In one implementation, the devices 706 associated with the associates 702 may be determined to be located at the facility 102. For example, the devices 706 may be detected on the local area network of the facility 102. The inquiry data 350 may be provided to those devices 706 that are present at the facility 102. Continuing the example, inquiries having a SLA of less than 20 seconds to generate output data 126 may use associates 702 present at the facility 102 given the higher bandwidth access to the sensor data 324.

In another implementation, one or more devices 706 that are located external to the facility 102 may be determined. For example, the associates 702 using those devices 706 may be at the associate office 704. The inquiry data 350 may be sent to at least one of the one or more associates 702 external to the facility 102. For example, some inquiries may have a SLA of less than 30 minutes and thus may be handled by associates 702 having lower bandwidth access to the sensor data 324. These inquiries may be directed to the associates 702 external to the facility 102.

In some implementations, inquiry data 350 may be sent to associates 702 at the facility 102 and at other locations. For example, the output data 126 may be initially determined using the response data 354 from associates 702 on-site at the facility 102, and later responses received from associates 702 at another location may be received at a later time and used to confirm the accuracy of the output data 126.

Block 1312 receives, from the one or more devices 706, response data 354. As described above, response data 354 may be indicative of selection of the one or more tentative results 348 or an indication of other conditions such as inability of the associate 702 to answer the inquiry.

Block 1314 generates output data 126 using the response data 354. For example, the tentative result 348 selected by the majority of the associates 702, as indicated by the response data 354, may be stored as the output data 126.

In some implementations, the output data 126 may be provided to the machine learning system used by block 1204 to determine the tentative results 348. For example, the artificial neural network may be trained using the output data 126 and the associated sensor data 324 associated with the event 124.

In some implementations, the associates 702 may need additional information to resolve the inquiry. For example, a block (not illustrated) may determine a first subset of the response data 354(1) comprises results different from a second subset of the response data 354(2). A block accesses second sensor data 324(2) acquired at the facility 102. Another block generates second inquiry data 350(2) comprising one or more of the second sensor data 324(2) or retrieval data for the second sensor data 324(2). Yet another block provides the second inquiry data 350(2) to the one or more devices 706 associated with the set of associates 702. The associates 702 may then return second response data 354(2) that may be used instead of, or in conjunction with, the previously acquired first response data 354(1) received earlier.

Returning to block 1302, the sensor data 324 associated with the event 124 that is accessed may be determined in several ways. One implementation is depicted by blocks 1316-1322.

Block 1316 determines a location of the event 124 within the facility 102. For example, using the image data 326 from a plurality of cameras 120(1) at known locations, the location in space of the event 124 may be determined.

Block 1318 accesses camera data. As described above with regard to the physical layout data 320, the camera data may comprise one or more of a location in the facility 102 of the camera 120(1) as well as an orientation of the camera 120(1). In some implementations, additional camera data such as operational status may be accessed.

Block 1320 determines, using the location of the event 124 and the camera data, a set of one or more cameras 120(1) likely within view of the event 124. For example, the camera 120(1) may be deemed to be within view of the event 124 when it is less than a threshold distance from the location of the event 124, and the field of view 128 of the camera 120(1) is determined to include the location of the event 124.

Block 1322 designates the image data 326 from the set of the one or more cameras 120(1) as the sensor data 324 as accessed by block 1302. For example, the subset of the image data 326 is acquired from the cameras 120(1) that are deemed to be within view of the event 124 may be used as the sensors data 324.

Returning to block 1304, the sensor data 324 may be used at least in part to generate the tentative results 348 in several ways. One implementation is depicted by blocks 1324-1330.

Block 1324 determines a location of the event 124 within the facility 102. For example, sensor data 324 may indicate that the tag 206 associated with the user 116 involving the event 124 is at a particular location based at least in part on signals 208 received by the RFID reader 120(8).

Block 1326 determines a set of one or more inventory locations 114 within a threshold distance of the location. For example, where the event 124 comprises a "pick" event, the threshold distance may be 1 (m). By using the location of the event 124, the inventory management module 316 may access the physical layout data 320 to determine the inventory locations 114 within 1 m of the user's 116 location.

Block 1328 accesses item data 322 associated with one or more items 104 stored at the set of one or more inventory locations 114. For example, given the inventory location 114(1) and the item data 322 indicating where items 104 are stored, a list of item identifiers indicating items 104(7), 104(21), and 104(25) as being possibly at the inventory location 114(1) may be accessed.

Block 1330 compares the sensor data 324 to the item data 322 to determine the one or more tentative results 348. For example, the item 104(25) may be removed from the list due to an excessive weight difference. As a result, the tentative result 348 may comprise item identifiers for the items 104(7) and 104(21). In other implementations, other analyses may be performed between the sensor data 324 and the item data 322. For example, one or more image processing techniques may be used to compare the image of the item 104 depicted in the image data 326 with previously stored images maintained in the item data 322.

Figure 14:
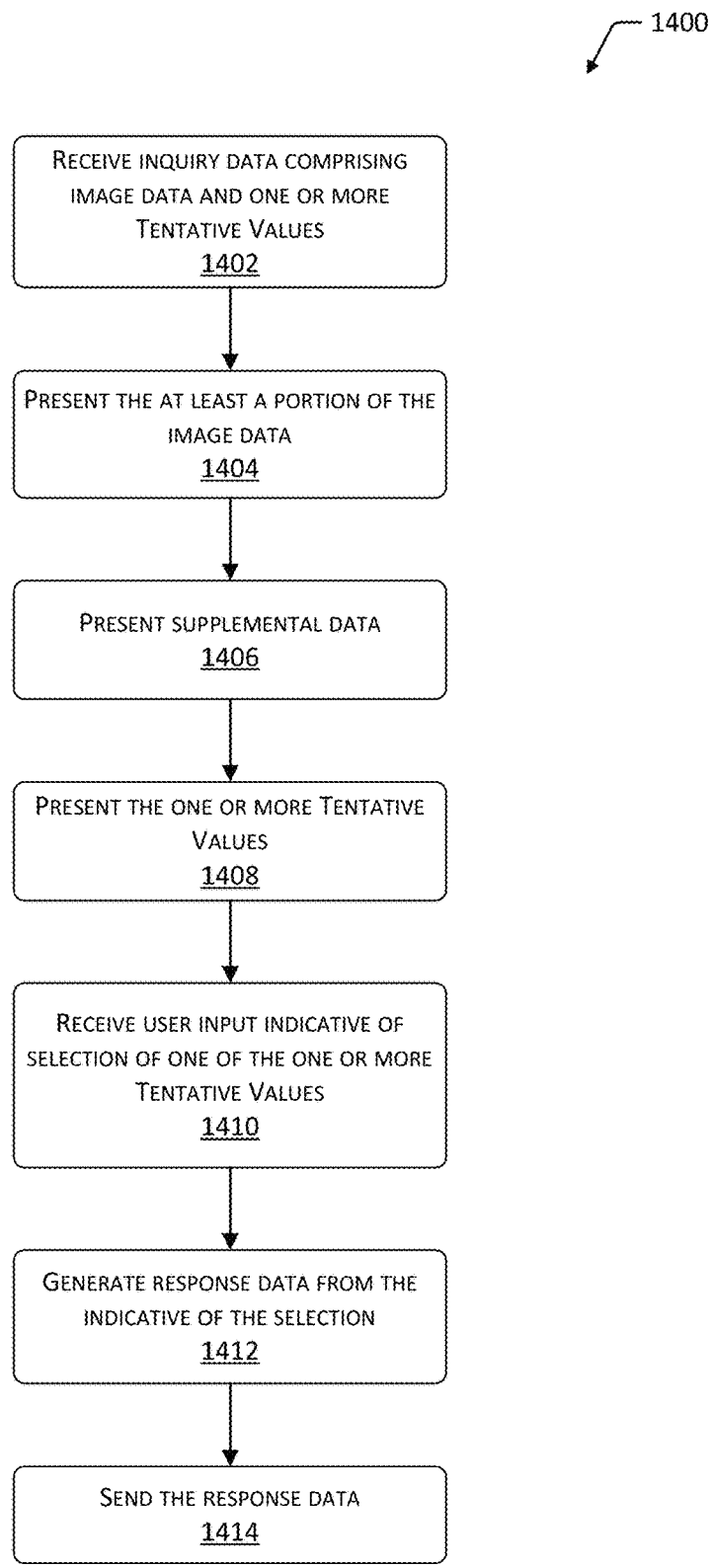
FIG. 14 depicts a flow diagram of a process for presenting an associate user interface.

FIG. 14 depicts a flow diagram 1400 of presenting an associate user interface 708, according to some implementations.

Block 1402 receives inquiry data 350. As described above, the inquiry data 350 may comprise information indicative of at least a portion of image data 326 acquired from the sensors 120 in the facility 102. In some implementations, the inquiry data 350 may include one or more of one or more tentative results 348, non-image data 328, and so forth. For example, the inquiry data 350 may include weights acquired from the weight sensors 120(6).

Block 1404 presents the at least a portion of the image data 326. For example, the associate user interface 708 may present the image data presentation 804. In some implementations, the non-image data 328 may be presented instead of, or in addition to, the image data presentation 804.

Block 1406 presents supplemental data 352. For example, the supplemental data 352 may comprise one or more graphical overlays that appear with the image data presentation 804. The graphical overlays may depict indicia of an object of interest as depicted by the image data 326. For example, a bounding box or highlight may be placed around an item 104 depicted in the image that needs to be identified by the associate 702.

When the one or more tentative results 348 are available, the block 1408 may present the one or more tentative results 348. For example, the user interface controls 802 may allow the associate 702 to select the tentative result 348 that is correct.

In some implementations, presenting the supplemental data 352 may include one or more images associated with the one or more tentative results 348. For example, the supplemental data 352 may present images of items stored at the facility 102, the users 116, and so forth.

Block 1410 receives user input associated with the inquiry. For example, the user input may comprise data indicative of selection of at least one of the one or more tentative results 348.

Block 1412 sends response data 354 indicative of the selection. For example, the response data 354 may be sent from the device 706 of the associate 702 to the inventory management module 316.

Figure 15:
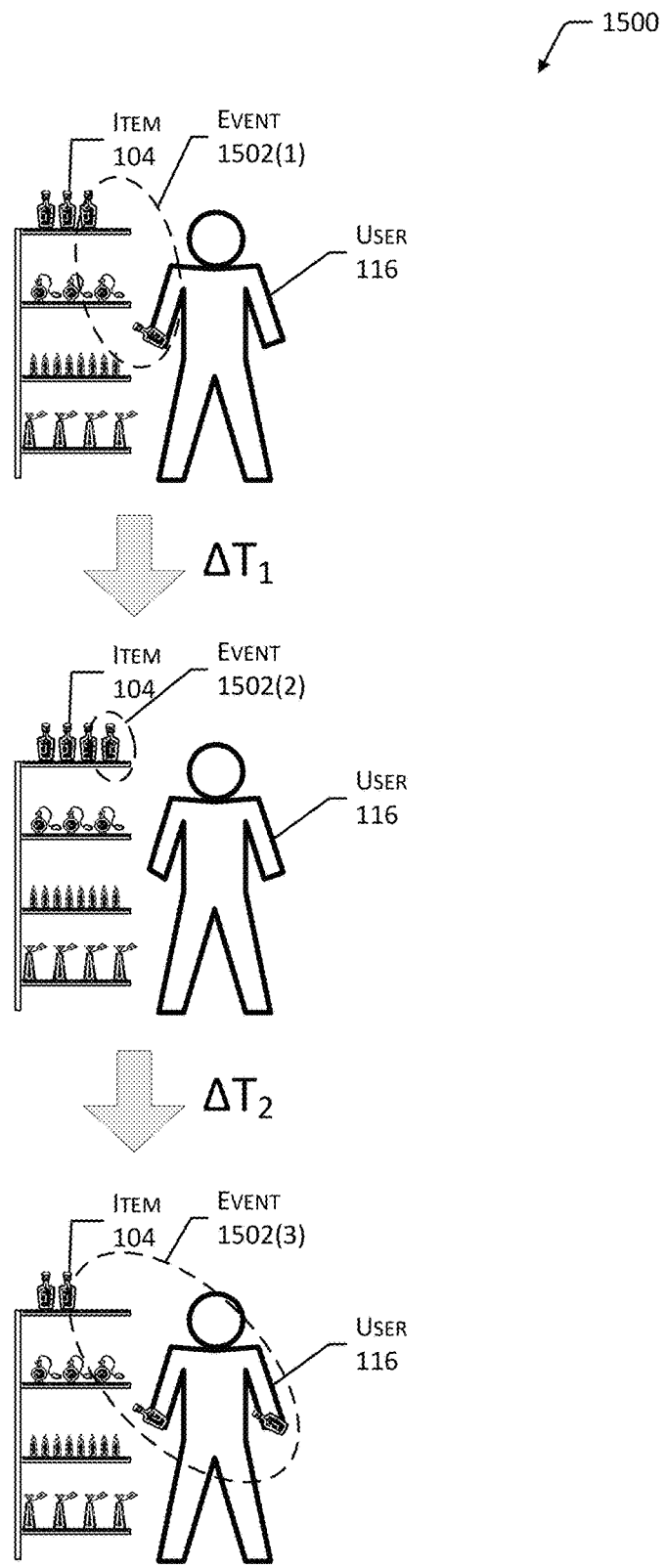
FIG. 15 depicts a sequence of events that occur within the facility within a threshold amount of time and within a threshold proximity of one another, thus leading to the merging of the events into a single, merged event.

FIG. 15 depicts a sequence of events 1500 that occur within the facility within a threshold amount of time and within a threshold proximity of one another, thus leading to the merging of the events into a single, merged event. As illustrated, in this example a first event 1502(1) occurs when the user 116 picks a first item from the shelf. As described above, image data, weight data, and/or other types of sensor data may be used to determine occurrence of the event 1502(1). For instance, the sensor data may be used to determine that the user 116 picked a particular item associated with a particular item identifier, and this item identifier may be associated as a tentative result of the event 1502(1).

Further, a confidence level may be calculated for and associated with the tentative result assigned to the event record corresponding to the event 1502(1). In instances where this confidence result is less than a threshold, the event merging module 340 may attempt to determine whether any events occur within a threshold proximity of the picking event (e.g., on the same shelf, within a 4 ft×4 ft×4 ft cubic area of the initial location of the item, or the like) and within a threshold time. If so, then the event merging module 340 may merge the events by merging the corresponding event records. Thereafter, inquiry data may be generated for the merged event and sent to a device 706 of an associate for determining a result of the merged event.

FIG. 15 further illustrates occurrence of a second event 1502(2), comprising the user 116 returning the picked item back to the shelf. Again, image data, weight data, and/or other types of sensor data may be used to determine occurrence of the event 1502(2). For instance, the sensor data may be used to determine that the user 116 replaced a particular item associated with a particular item identifier (such as the same identifier associated with the picking of 1502(1)), and this item identifier may be associated as a tentative result of the event 1502(2).

Further, a confidence level may be calculated for and associated with the tentative result assigned to the event record corresponding to the event 1502(2). Again, in instances where this confidence result is less than a threshold, the event merging module 340 may attempt to determine whether any events occur within a threshold proximity of this event and within a threshold time, both prior to and after the event 1502(2). If so, then the event merging module 340 may merge the event records corresponding to the events. Thereafter, inquiry data may be generated for the merged event and sent to a device 706 of an associate for determining a result of the merged event.

Finally, FIG. 15 illustrates occurrence of a third event 1502(3), comprising the user 116 picking two of the same items from the shelf. Again, image data, weight data, and/or other types of sensor data may be used to determine occurrence of the event 1502(3). For instance, the sensor data may be used to determine that the user 116 picked two instances of a particular item associated with a particular item identifier (such as the same identifier associated with the picking of 1502(1) and the returning of 1502(2)), and this item identifier may be associated as a tentative result corresponding to the event 1502(3).

Further, a confidence level may be calculated for and associated with the tentative result assigned to the event record associated with the event 1502(3). Again, in instances where this confidence result is less than a threshold, the event merging module 340 may attempt to determine whether any events occur within a threshold proximity of this event and within a threshold time, both prior to and after the event 1502(3). If so, then the event merging module 340 may merge the event records corresponding to the events. Thereafter, inquiry data may be generated for the merged event and sent to a device 706 of an associate for determining a result of the merged event.

In this example, a tentative result assigned to at least one of the events 1502(1)-(3) is associated with a confidence level that is below the confidence level threshold. Further, in this example all three events occur within a threshold proximity and within a threshold time, thus resulting in the merging of the three events into a single, merged event, as described in further detail with reference to FIG. 16.

Figure 16:
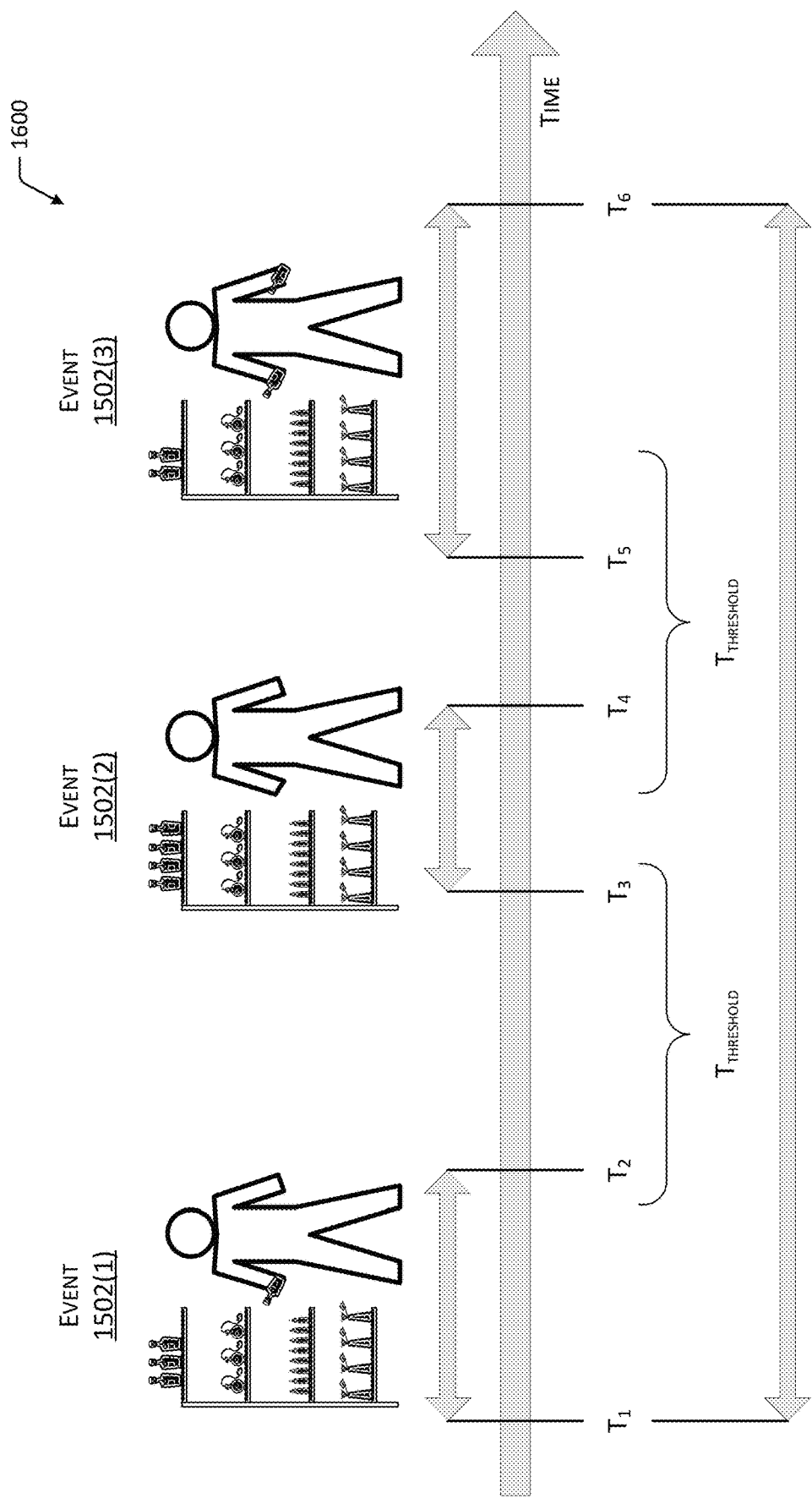
FIG. 16 depicts the events of FIG. 15 along a timeline and the resulting merging of the events.

FIG. 16 depicts the events of FIG. 15 along a timeline and the resulting merging 1600 of the events. As illustrated, the event determination module 336 determines that the first event 1502(1) has a starting time of $T_1$ and an ending time of $T_2$. Further, the event determination module 336 determines that the second event 1502(2) has a starting time of $T_3$ and an ending time of $T_4$. Finally, the event determination module 336 determines that the third event 1502(3) has a starting time of $T_5$ and an ending time of $T_6$.

In this example, the event determination module 340 also determines that the event record corresponding to the third event 1502(3) is associated with a confidence level that is less than a threshold. As such, the event merging module 340 attempts to determine whether to merge the event 1502(3) with one or more additional events prior to generating the inquiry data and requesting human input from an associate 702. In this example, the event merging module 340 first determines whether the an event exists that is: (i) within a threshold proximity of a location of the third event 1502(3), and (ii) occurred within a threshold time of the time range associated with the third event 1502(3). In this example, because the second event 1502(2) occurred on the same shelf, the event merging module 340 determines that the first criteria is met. Further, the event merging module 340 determines that an ending time associated with the second event ($T_4$) is within the threshold amount of time ($T_{threshold}$) of a beginning time associated with the third event ($T_5$). While the event merging module 340 may also attempt to determine whether an event occurred on the same shelf and after the third event 1502(3) (by determining whether a beginning time of such a subsequent event is within the threshold time of the ending time of the third event ($T_6$)), no such event exists in this example.

After determining that the second event 1502(2) is to be merged with the third event 1502(3), the event merging module 340 may store an indication of this merging and may cancel a pending inquiry for the second event 1502(2) if such an inquiry exists. Alternatively, if the second event 1502(2) is already associated with a particular result, the event merging module 340 may delete this result or send an instruction to a downstream system to disregard (e.g., delete) this result. The event merging module 340 may also queue an inquiry regarding the merged event.

Furthermore, before or after queuing an inquiry the merged event, the event merging module 340 may continue to determine whether any additional events are to be merged with the second and third events. To do so, the event merging module 340 determines whether an event exists that is: (i) within a threshold proximity of a location of the third event 1502(3), and (ii) occurred within a threshold time of the time range of the merged event comprising the second third events 1502(2) and 1502(3) (that is, within a threshold amount of time from a starting time of the second event ($T_4$) to an ending time of the third event ($T_6$)). In this example, the event determination module 340 determines that the first event 1502(1) meets both criteria. Thus, the event merging module 340 merges the record corresponding to first event 1502(1) with the records corresponding to the second and third events, resulting in a merged event record 1602. Again, the event merging module 340 may store an indication of the merged event 1602 and may cancel a pending inquiry for the record associated with first event 1502(1) if such an inquiry exists. Alternatively, if the first event 1502(1) is already associated with a particular result, the event merging module 340 may delete this result or send an instruction to a downstream system to disregard (e.g., delete) this result. The event merging module 340 may also queue an inquiry regarding the merged event record 1602.

Figure 17:
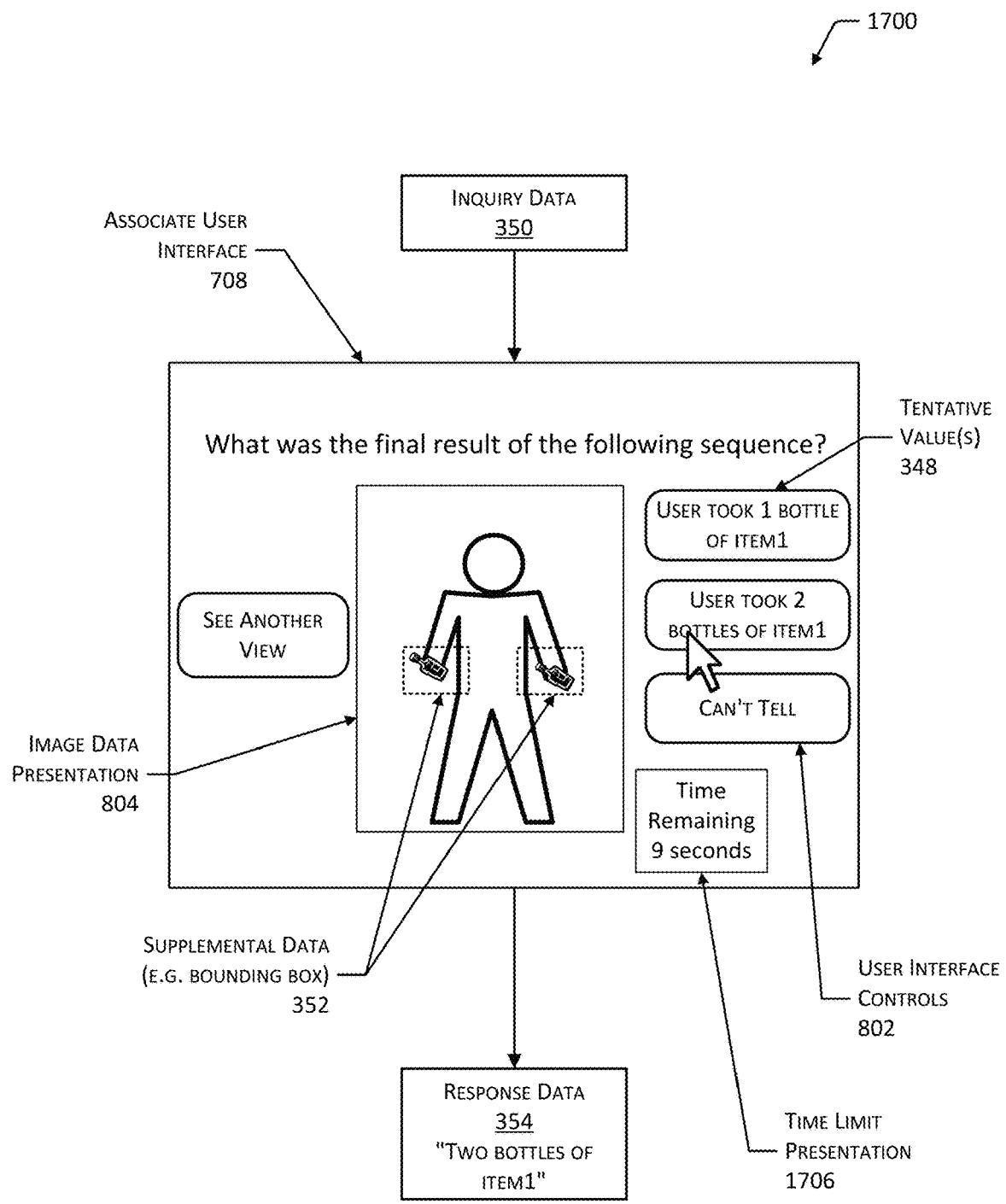
FIG. 17 illustrates an associate user interface configured to present, to an associate, sensor data (e.g., image data) corresponding to a merged event to generate response data indicative of an aggregate result of the merged event.

FIG. 17 illustrates an associate user interface configured to present, to an associate, sensor data (e.g., image data) corresponding to a merged event 1602 to generate response data indicative of an aggregate result of the merged event 1602. Again, the associate user interface 708 may include one or more user interface controls 802 and image data presentation 804 elements. The user interface control 802 may be associated with the tentative results 348. In this example, the tentative results determined by the event merging module 340 allow the associate to indicate that the result of the merged event is that the user 116 took one bottle of the item or took two bottles of the item. Additionally, the user interface control 802 may include additional controls such as a "can't tell" indicating that the associate 702 is unable to provide input, or a "see another view" configured to provide image data 326 from a different camera 120(1). In some implementations, other controls may be available to the associate 702 in the associate user interface 708. For example, image manipulation controls may allow the associate 702 to zoom, minimize, change contrast, sharpen, fast forward or rewind, and so forth. Further, the interface 706 may allow the user to enter a free-form response to the question regarding the final result of the sequence of actions. For instance, the interface 706 may include a text box in which the associate 702 may enter a result of the sequence as determined by the associate.

Once the associate 702 selects a particular user interface control 802 designating one or more of the tentative results 348, the associate user interface 708 may generate data that is used by the device 806 to generate the response data 354. In this example, the associate 702 has selected that the user took two bottles of the item as a final result of the sequence of the three events shown in the video clip.

Figure 18:
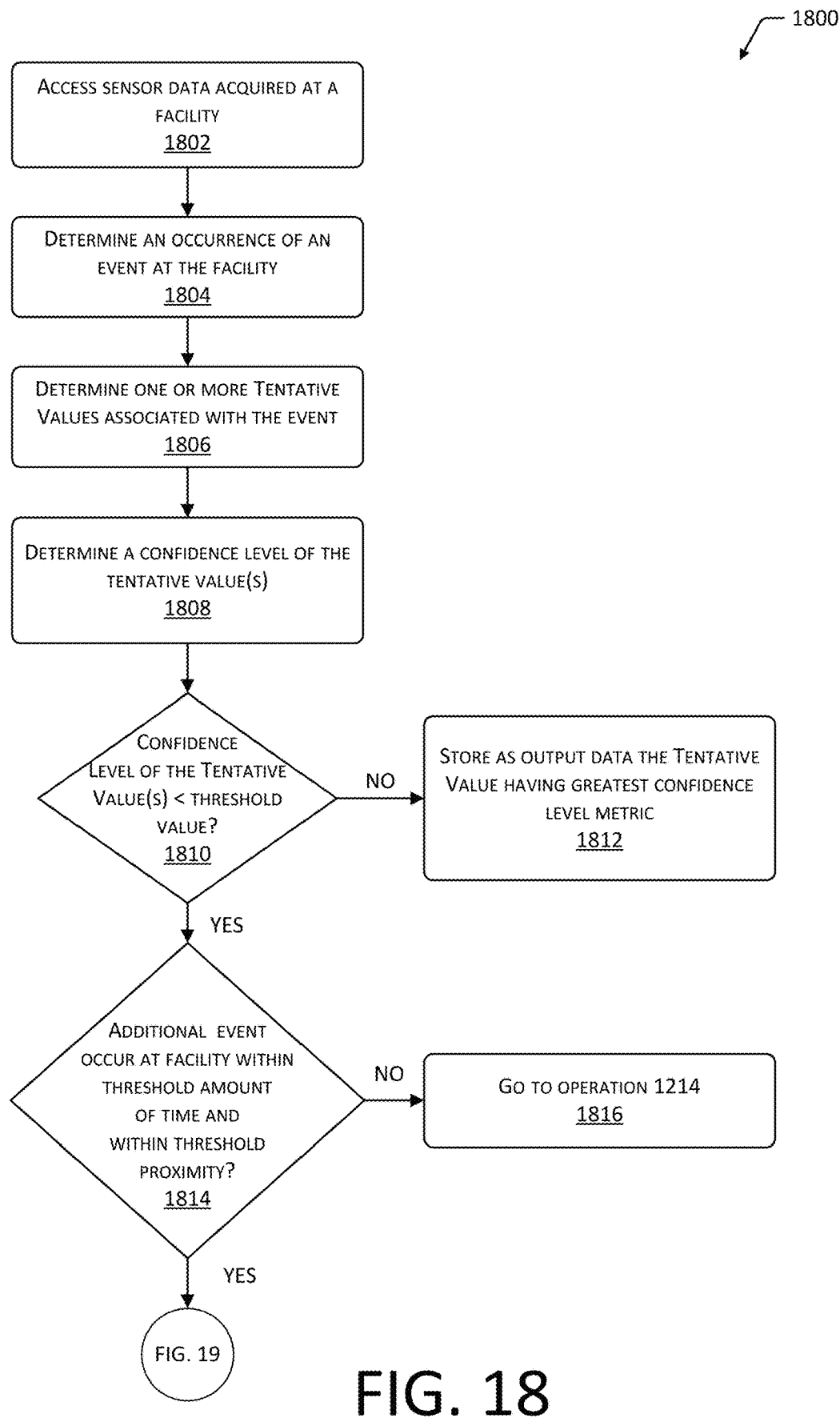
FIGS. 18-20 collectively depict a flow diagram of a process for merging multiple events into a single, merged event and storing a result indicative of an aggregate result of the merged event, as determined by an associate.
Figure 19:
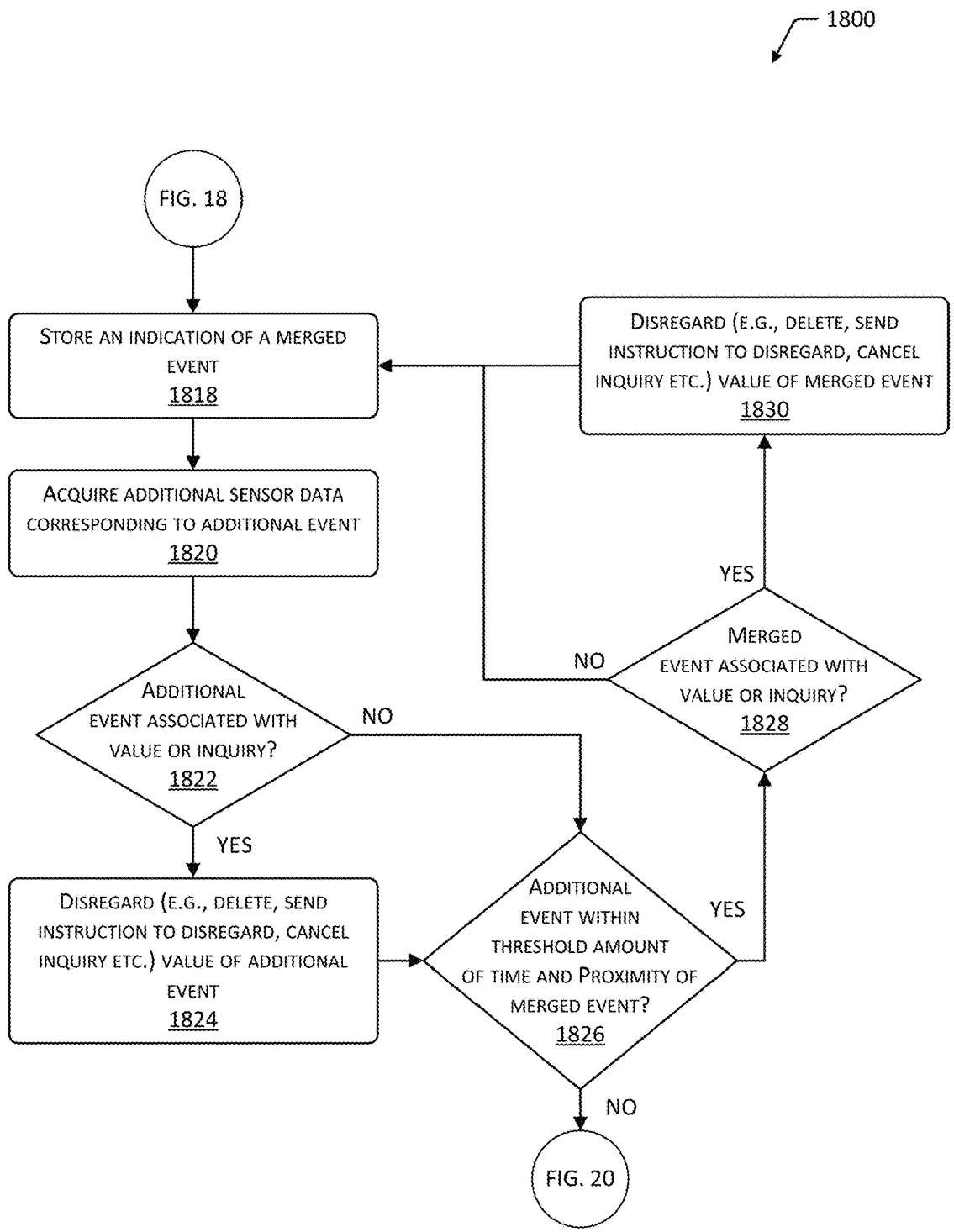
Figure 20:
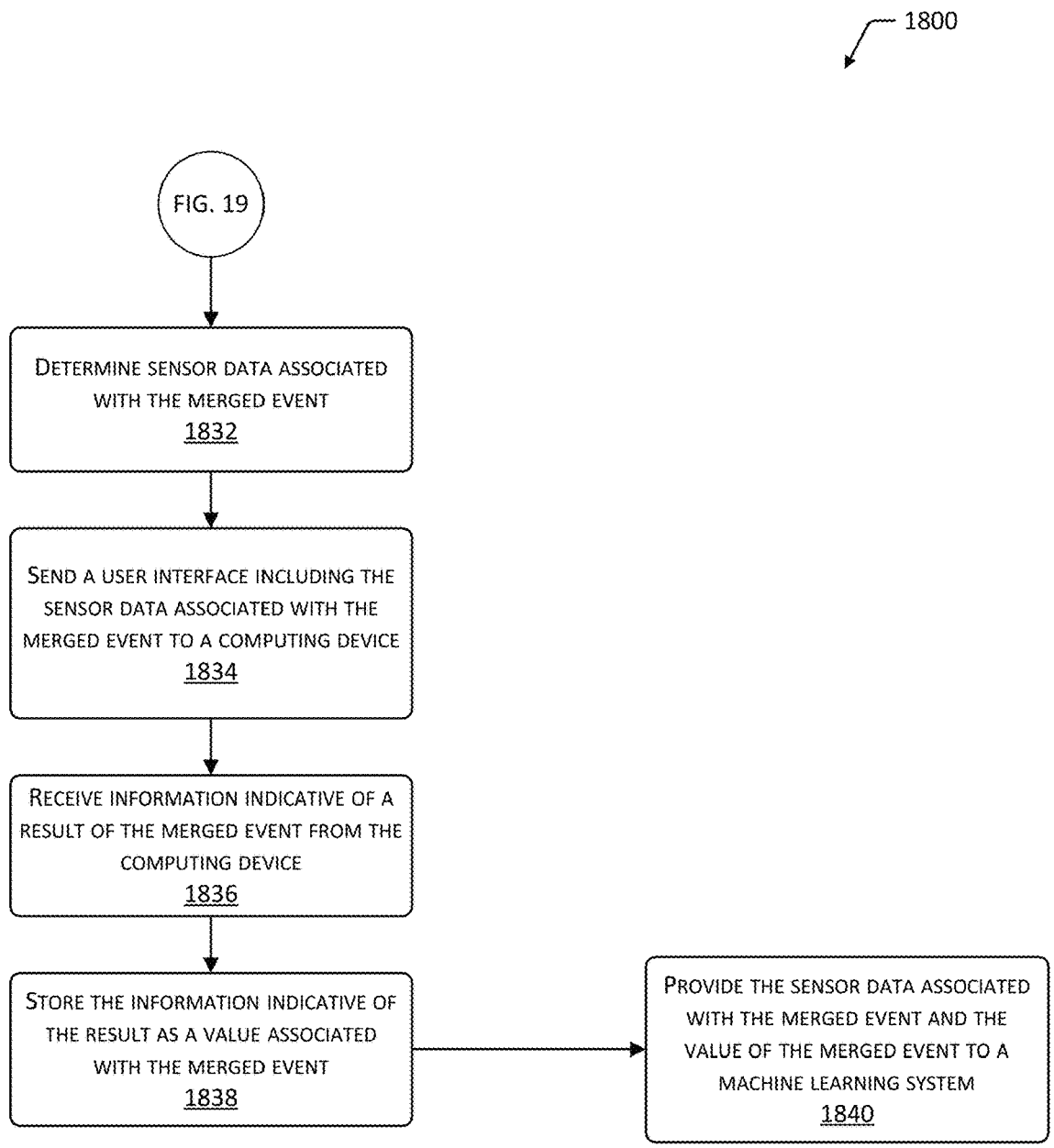

FIGS. 18-20 collectively depict a flow diagram 1800 of a process for merging multiple events into a single, merged event and storing a result indicative of an aggregate result of the merged event, as determined by an associate.

Block 1802 accesses sensor data 324 acquired at the facility 102. For example, sensor data 324 may comprise image data 326 acquired from one or more cameras 120(1).

Block 1804 determines an occurrence of an event 124 at the facility 102. For example, the event determination module 336 may identify an item 104 picked from an inventory location 114, that two users 116 have passed within a threshold distance of one another, and so forth. In another example, the event determination module 336 may determine that an camera 120(1) has been displaced or an inventory location 114 has been moved.

Block 1806 determines one or more tentative results 348 associated with the event 124. For example, when the event 124 comprises a user 116 interacting with an item 104, the event determination module 336 may generate, using the sensor data 324, tentative results 348 comprising a list of the item 104 identifiers that may be depicted in the image data 326.

In another example, where the event 124 comprises a plurality of users 116 moving towards one another, the plurality of tentative results 348 may comprise user identifiers indicative of identities of the plurality of users 116.

Block 1808 determines a confidence level associated with the one or more tentative results associated with the event. For instance, depending on the quality of the sensor data, the tentative results may be relatively certain or relatively uncertain. Block 1810 determines whether the confidence level is less than a threshold result. If not, then block 1812 stores as output data 126 the tentative result 348 having the greatest confidence level 344. For example, the automated system may be able to identify the item 104 that was picked from the inventory location 114 with a confidence level 344 that is high enough to not call for human intervention, and may use that tentative result 348.

If, however, the confidence level is less than the threshold result, then block 1814 determines whether another event occurred: (i) within a threshold proximity of the event determined at 1804, and (ii) within a threshold time of the event determined at 1804. If not, then block 1816 ("Proceed to Block 1214") follows the steps described above regarding utilizing human associates for determining the result of a single event.

If, however, such an additional event is identified, then the flow diagram proceeds to FIG. 19. Here, block 1818 stores an indication of a merged event. That is, information such as a time period associated with the merged event a location of the merged event (e.g., the location of the initial event), and the like the may be stored. Further, block 1820 acquires additional sensor data corresponding to the additional event, such as image data, weight data, and the like. In some instances this sensor data associated with the second event may have been previously acquired by one or more sensors (e.g., proximate in time to the occurring of the second event, which may have occurred before, after, and/or during a time range of the first event).

Block 1822 determines whether the additional event that has been merged into the additional event is already associated with a result or whether an inquiry has been queued for the additional event. If so, then block 1824 represents disregarding any such result or inquiry. This may include deleting the stored result, sending an instruction to a downstream service to disregard (e.g., delete) the result, cancel the inquiry regarding the record corresponding to additional event, or the like.

Block 1826 represents determining whether yet another additional event exists that is to be merged with the merged event. This includes determining whether an event exists that: (i) occurred at a location that is within a threshold proximity of the location of the initial event, and (ii) occurred within a threshold time of the merged event (e.g., within a threshold time of an earliest starting time of the events making up the merged event or within a threshold time of a latest ending time of the events making up the merged event). If so, then block 1828 determines whether the merged event (prior to the merging of the latest event to be added) is already associated with the result or whether an inquiry for the merged event record has been queued. That is, this block determines whether a human associate has already analyzed the merged event record and provided a result, or whether the system has queued up a request to have such an inquiry performed. If so, block 1830 represents disregarding this result (similar to block 1824, although for the merged event in this instance), given that the merged event is to be merged with yet another event. The flow diagram 1800 then proceeds to block 1818 to merge the additional event with the previously merged events.

When no other events are to be merged, meanwhile, the flow diagram proceeds to FIG. 20. Block 1832 is configured to determine sensor data 324 associated with the occurrence of the merged event 124. For example, the subset may comprise image data 326 such as video acquired starting at a time before the an earliest starting time of the merged events and ending at a time after the conclusion of the latest of the merged events.

Block 1834 sends an associate user interface 708 including the sensor data to a client computing device of an associate. As described above, the associate user interface 708 may be generated using inquiry data 350. The associate user interface 708 may present some or all of the image data 326 (e.g., the video clip corresponding to the merged event). In some implementations, the associate user interface 708 may present at least a portion of the one or more tentative results 348. As described above, such as with regard to FIG. 8, the associate user interface 708 may include one or more user interface controls 802. The associate 702 may activate one or more of the user interface controls 802 to select one of the tentative results 348 presented.

In some implementations, one or more of the tentative results 348 may be intentionally erroneous. For example, these intentionally erroneous tentative results 348 may be injected into the inquiry process to ascertain whether the associate 702 is adequately performing the selection.

As described above, in some implementations, the associate user interface 708 may present supplemental data 352. For example, where the event 124 comprises the user 116 interacting with an item 104, the supplemental data 352 may comprise previously stored images of the items 104 indicated by the item identifiers in the tentative results 348. In another example, where the event 124 comprises several users 116 moving towards one another, the supplemental data 352 may comprise previously stored images of the users 116 as indicated by the user identifiers in the tentative results 348.

In some implementations, instead of, or in addition to providing the user interface, other actions may be taken. For example, the inventory management module 316 may dispatch an associate 702 who is at the facility 102 to the location in the facility 102 at which the event 124 occurred. The associate 702 may be equipped with one or more sensors 120, such as a wearable camera 120(1). Based at least in part on the image data 326 acquired from the camera 120(1) carried by the associate 702, the inventory management module 316 may be able to automatically determine the output data 126. In another implementation, the associate 702 carrying the camera 120(1) may be presented with the associate user interface 708 and may provide response data 354.

Block 1836 receives, from the associate user interface 708, response data 354 indicative of a selection of one or more tentative results 348. In some implementations, the response data 354 may indicate no match, that the information provided is insufficient to answer the inquiry, and so forth.

Block 1838 stores the selected one of the tentative results 348 as the output data 126 for association with the merged event record. For example, the inquiry module 338 may determine the tentative result 348 that was selected by a majority of the associates 702 and designate the majority selected tentative result 348 as the output data 126.

The output data 126 may be used for a variety of purposes. For example, the output data 126 may be used to bill a particular account. In another example, the output data 126 may be used to calibrate the camera 120(1). For example, the output data 126 may comprise an indication by the associate 702 of particular points (such as the corners) of an inventory location 114. This output data 126 may then be used to recalibrate the image data 326 from the camera 120(1).

Block 1840 may provide the subset of the sensor data 324 and the output data 126 to the machine learning system that generated the tentative results 348 or to another machine learning system. The machine learning system may then be trained or otherwise updated using the sensor data 324 and the corresponding output data 126 produced from the response data 354, potentially improving accuracy over time. For example, the sensor data 324 and the output data 126 may be designated as training data. Continuing the example, where the machine learning system uses OpenCV, the training data may be used to modify or create new Bayesian classifiers using the function "CvNormalBayes- Classifier::train". Different machine learning systems may use different processes for training.

The processes discussed herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    acquiring first sensor data generated by at least a first sensor, the first sensor data indicative of a first event occurring within an environment, the first event associated with a first time range;
    determining, using the first sensor data, a first result associated with the first event;
    storing, in association with the first event, a first indication of the first result;
    acquiring second sensor data generated by at least one of the first sensor or a second sensor, the second sensor data indicative of a second event occurring within the environment, the second event associated with a second time range;
    determining, using the second sensor data, a second result associated with the second event;
    storing, in association with the second event, a second indication of the second result;
    determining that the second time range is within a threshold amount of time of the first time range;
    based at least in part on the second time range being with the threshold amount of time of the first time range, determining that the first event and the second event comprise a merged event, the merged event spanning at least the first time range and the second time range;
    determining, using at least the first sensor data and the second sensor data, a final result for the merged event; and
    storing, in association with the merged event, a third indication of the final result.

2. The method of claim 1, further comprising at least one of:
    deleting at least one of the first indication of the first result or the second indication of the second result; or
    sending an instruction to disregard at least one of the first result or the second result.

3. The method of claim 1, further comprising determining that the second event occurred at a location within the environment that is within a threshold proximity of a location of the first event.

4. The method as recited in claim 1, wherein the determining that the second event occurred within threshold amount of time of the first event comprises determining at least one of:
    determining that a start time of the second event is within a threshold time of an end time of the first event; or
    determining than an end time of the second event is within the threshold time of a start time of the first event.

5. The method as recited in claim 1, further comprising:
    acquiring third sensor data indicative of a third event occurring within the environment, the third event associated with a third time range;
    determining that the third time range is within the threshold amount of time of at least one of the first time range or the second time range;
    storing a fourth indication that the first event, the second event, and the third event comprise a new merged event, the new merged event spanning at least the first time range, the second time range, and the third time range; and
    storing, in association with the new merged event, a fifth indication of a new final result.

6. The method as recited in claim 1, further comprising:
    determining that a confidence level of an initial final result of the merged event is less than a threshold confidence level;
    generating inquiry data associated with the first time range and the second time range of the merged event, the inquiry data including at least the first sensor data and the second sensor data;

sending, to a client computing device, the inquiry data including the at least the first sensor data and the second sensor data; and receiving, from the client computing device, information indicative of the final result of the merged event, the final result being different than the initial final result.

7. The method as recited in claim 1, wherein the acquiring the first sensor data comprises acquiring, from a weight sensor, an indication of a change in weight on a shelf within the environment, and further comprising:

determining, based at least in part on the change in weight, a first result associated with the first event, the first result indicating that an item associated with a particular item identifier has been removed from the shelf.

8. The method as recited in claim 1, wherein the acquiring the first sensor data comprises acquiring, from a camera, video data depicting a shelf within the environment, and further comprising:

determining, based at least in part on the video data, a first result associated with the first event, the first result indicating that an item associated with a particular item identifier has been removed from the shelf.

9. A system comprising:

a first sensor;

one or more processors; and one or more computer-readable media storing computer-executable instructions that, when executed on the one or more processors, cause the one or more processors to perform acts comprising:

acquiring first sensor data generated by the first sensor;

analyzing the first sensor data to determine a first event occurring within an environment, the first event associated with a first time range;

acquiring second sensor data generated by at least the first sensor or a second sensor;

analyzing the second sensor data to determine a second event occurring within the environment, the second event associated with a second time range;

determining that the second time range is within a threshold amount of time of the first time range;

determining that the first event occurred at a first location within the environment that is within a threshold proximity of a second location of the second event;

determining that the first event and second event comprise a merged event, the merged event spanning at least the first time range and the second time range;

determining, using at least the first sensor data and the second sensor data, a final result associated with the merged event; and storing, in association with the merged event, an indication of the final result associated with the merged event.

10. The system of claim 9, wherein the determining that the second time range is within the threshold amount of time of the first time range comprises determining at least one of:

determining that a start time of the second event is within a threshold time of an end time of the first event; or determining than an end time of the second event is within the threshold time of a start time of the first event.

11. The system of claim 9, the acts further comprising:

acquiring third sensor data indicative of a third event occurring within the environment, the third event associated with a third time range;

determining that the third time range is within the threshold amount of time of at least one of the first time range or the second time range;

storing an indication that the first event, the second event, and the third event comprise a new merged event, the new merged event spanning at least the first time range, the second time range, and the third time range; and storing, in association with the new merged event, an indication of a new final result.

12. The system of claim 9, the acts further comprising at least one of:

deleting at least one of a first result associated with the first event or a second result associated with the second event; or sending an instruction to disregard at least one of the first result or the second result.

13. The system of claim 9, the acts further comprising:

determining that a confidence level of an initial final result of the merged event is less than a threshold confidence level;

generating inquiry data associated with the first time range and the second time range of the merged event, the inquiry data including at least the first sensor data and the second sensor data;

sending, to a client computing device, the inquiry data including the at least the first sensor data and the second sensor data; and receiving, from the client computing device, information indicative of the final result of the merged event, the final result being different than the initial final result.

14. A system comprising:

a first sensor;

one or more processors; and one or more computer-readable media storing computer-executable instructions that, when executed on the one or more processors, cause the one or more processors to perform acts comprising:

acquiring first sensor data generated by the first sensor;

analyzing the first sensor data to determine a first event occurring within an environment, the first event associated with a first time range;

acquiring second sensor data generated by at least the first sensor or a second sensor;

analyzing the second sensor data to determine a second event occurring within the environment, the second event associated with a second time range;

determining that the second time range is within a threshold amount of time of the first time range;

determining that the first event and second event comprise a merged event, the merged event spanning at least the first time range and the second time range;

determining, using at least the first sensor data and the second sensor data, a final result associated with the merged event; and storing, in association with the merged event, an indication of the final result associated with the merged event.

15. The system of claim 14, the acts further comprising determining that the first event occurred at a first location within the environment that is within a threshold proximity of a second location of the second event.

16. The system of claim 14, acts further comprising:

determining, using the first sensor data, a first result associated with the first event;

determining, using the second sensor data, a second result associated with the second event; and determining that a confidence level associated with at least one of the first result or the second result is less than a threshold confidence level.

17. The system of claim 16, the acts further comprising at least one of:

deleting at least one of the first result or the second result; or sending an instruction to disregard at least one of the first result or the second result.

18. The system of claim 14, the acts further comprising:

generating inquiry data associated with the merged event, the inquiry data including at least the first sensor data and the second sensor data;

sending, to a client computing device, the inquiry data including the at least the first sensor data and the second sensor data; and receiving, from the client computing device, information indicative of the final result of the merged event.

19. The system as recited in claim 18, the acts further comprising sending, to the client computing device:

first data causing the client computing to present a first user interface (UI) element to facilitate selection of a first result of the merged event; and second data causing the client computing device to present a second UI element to facilitate selection of a second result of the merged event.

20. The system as recited in claim 14, the acts further comprising:

determining, using the first sensor data, a first tentative result associated with the first event;

determining a confidence level associated with the first tentative result;

determining that the confidence level is less than a threshold confidence level; and wherein the determining that the first event and the second event comprise the merged event is based at least in part on the determining that the confidence level is less than the threshold confidence level.

* * * * *